US010430720B2

(12) United States Patent
Bevan et al.

(10) Patent No.: US 10,430,720 B2
(45) Date of Patent: *Oct. 1, 2019

(54) MOVEABLE STORAGE

(71) Applicant: Comcast Cable Communications, LLC, Philadelphia, PA (US)

(72) Inventors: Frances Bevan, Voohees, NJ (US); David Markowitz, Plymouth Meeting, PA (US); Michael Rekstad, Langhorne, PA (US); Jae Sim, Upper Darby, PA (US); Christopher Stone, Newtown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/443,437

(22) Filed: Feb. 27, 2017

(65) Prior Publication Data

US 2017/0330100 A1     Nov. 16, 2017

Related U.S. Application Data

(60) Continuation of application No. 14/816,787, filed on Aug. 3, 2015, now Pat. No. 9,626,626, which is a continuation of application No. 14/184,133, filed on Feb. 19, 2014, now Pat. No. 9,129,217, which is a division of application No. 13/401,294, filed on Feb. 21, 2012, now Pat. No. 8,700,666.

(51) Int. Cl.
*G06F 17/30* (2006.01)
*G06N 7/00* (2006.01)
*G06F 16/00* (2019.01)
*G06F 16/17* (2019.01)
*G06N 5/04* (2006.01)

(52) U.S. Cl.
CPC ............. *G06N 7/005* (2013.01); *G06F 16/00* (2019.01); *G06F 16/17* (2019.01); *G06N 5/04* (2013.01)

(58) Field of Classification Search
CPC .... G06F 17/30; G06F 17/30129; G06F 17/00; G06F 16/17; G06F 16/00; G06N 7/005
USPC .................................................. 707/600–899
See application file for complete search history.

(56) References Cited

U.S. PATENT DOCUMENTS

| 7,143,241 B2 | 11/2006 | Hull |
| 7,978,653 B2 * | 7/2011 | Sasaki ..................... H04M 3/50 370/329 |

(Continued)

OTHER PUBLICATIONS

"Amazon Simple Storage Service FAQs," http://aws.amazon.com/s3/faqs/[Oct. 14, 2011 11:44:29 AM], pp. 1-9.

(Continued)

*Primary Examiner* — Isaac M Woo
(74) *Attorney, Agent, or Firm* — Banner & Witcoff, Ltd.

(57) ABSTRACT

A system for storing and moving data based on the location of a user or a change in location of a user is described herein. Data associated with a user may be stored at one or more storage devices associated with a location of the user. Some or all of the data associated with the user may be moved to one or more other storage devices if, for example, the user moves to a different location or is expected to move to a different location, so that the user's data may be more efficiently accessed by the user.

40 Claims, 12 Drawing Sheets

(56) References Cited

U.S. PATENT DOCUMENTS

| | | |
|---|---|---|
| 8,031,674 B2 | 10/2011 | Weniger et al. |
| 9,781,540 B2 * | 10/2017 | Jagannathan .......... G06Q 50/01 |
| 2003/0144849 A1 | 7/2003 | Kakivaya et al. |
| 2005/0053050 A1 | 3/2005 | Ballinger et al. |
| 2006/0259690 A1 | 11/2006 | Vittal et al. |
| 2009/0287750 A1 | 11/2009 | Banavar et al. |
| 2009/0291696 A1 | 11/2009 | Cortes et al. |
| 2010/0017237 A1 | 1/2010 | Dalesandro et al. |
| 2010/0257252 A1 | 10/2010 | Dougherty et al. |
| 2010/0332479 A1 | 12/2010 | Prahlad et al. |
| 2010/0332818 A1 | 12/2010 | Prahlad et al. |
| 2011/0145367 A1 | 6/2011 | Ananthanarayanan et al. |
| 2011/0145392 A1 | 6/2011 | Dawson et al. |
| 2012/0110044 A1 | 5/2012 | Nagpal et al. |
| 2013/0144978 A1 | 6/2013 | Jain et al. |

OTHER PUBLICATIONS

"Amazon Simple Storage Service (Amazon S3)," http://aws.amazon.com/s3/faqs/[Oct. 14, 2011 11:44:29 AM], pp. 1-6.

Hayes, "Cloud Computing," Communications of the ACM, vol. 51, No. 7, Jul. 2008, pp. 9-12.

Khurshid et al., "Performance Evaluation of the Illinois Cloud Computing Testbed," pp. 1-12.

Lee, Abstract, "Geopot: a Cloud-based geolocation data service for mobile applications," http://www.tandfonline.com/doi/abs/10.1080/13658816.2011.558017, Oct. 12, 2011, pp. 1-3.

Lundqvist et al., "Service Program Mobility: A new Paradigm for Mobile Operators' Service Delivery," pp. 1-9.

Mell & Grance, "The NIST Definition of Cloud Computing (Draft), Recommendations of the National Institute of Standards and Technology," Special Publication No. 800-145 (Draft), Jan. 2011, pp. 1-7.

\* cited by examiner

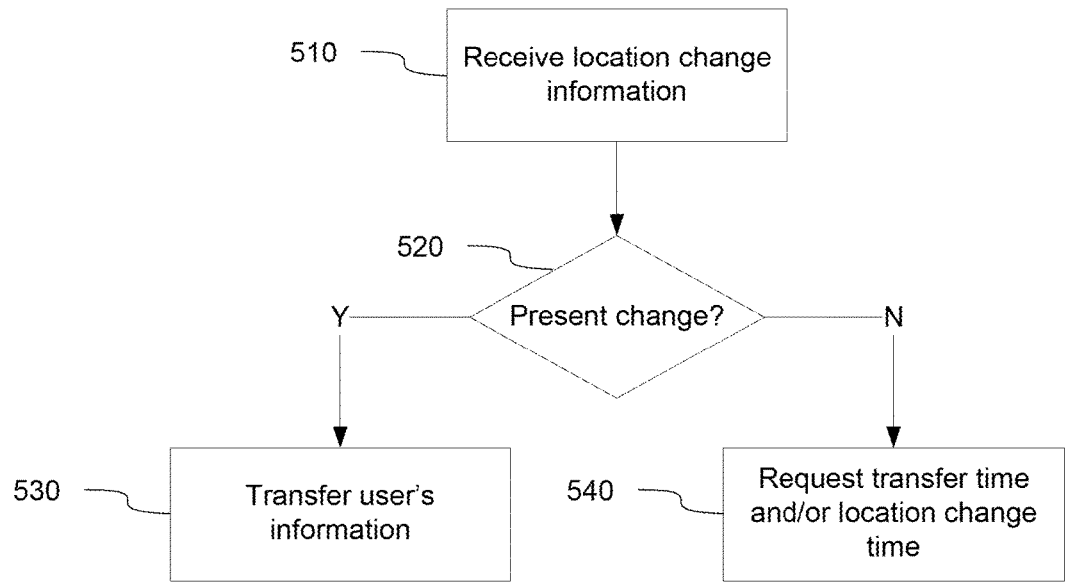
FIG. 5
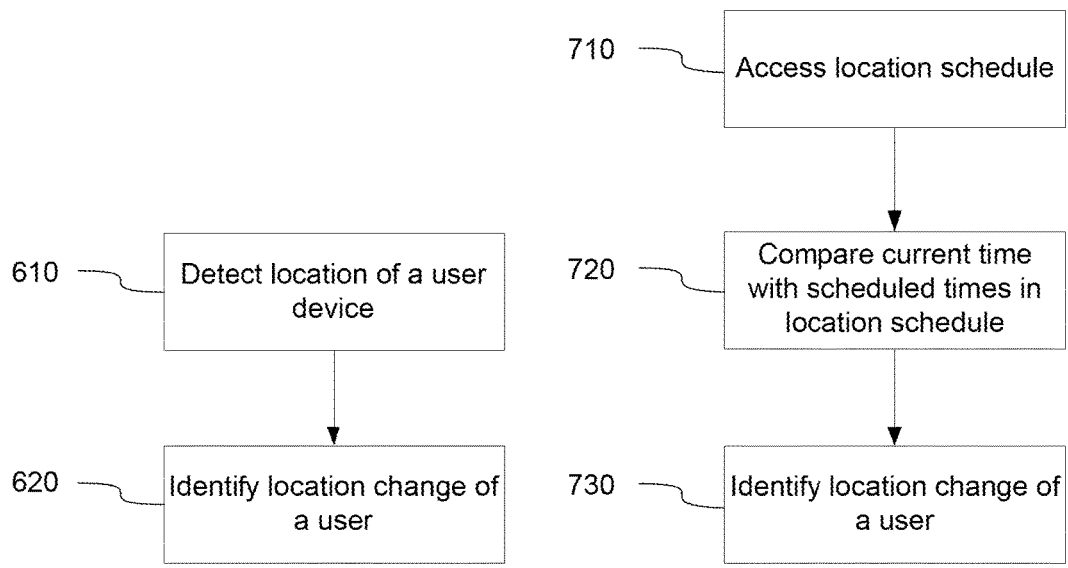
FIG. 6
FIG. 7

1200

Enter Schedule

Location:

Time Frame:

Action:

View Schedule | More Options | Submit

FIG. 12

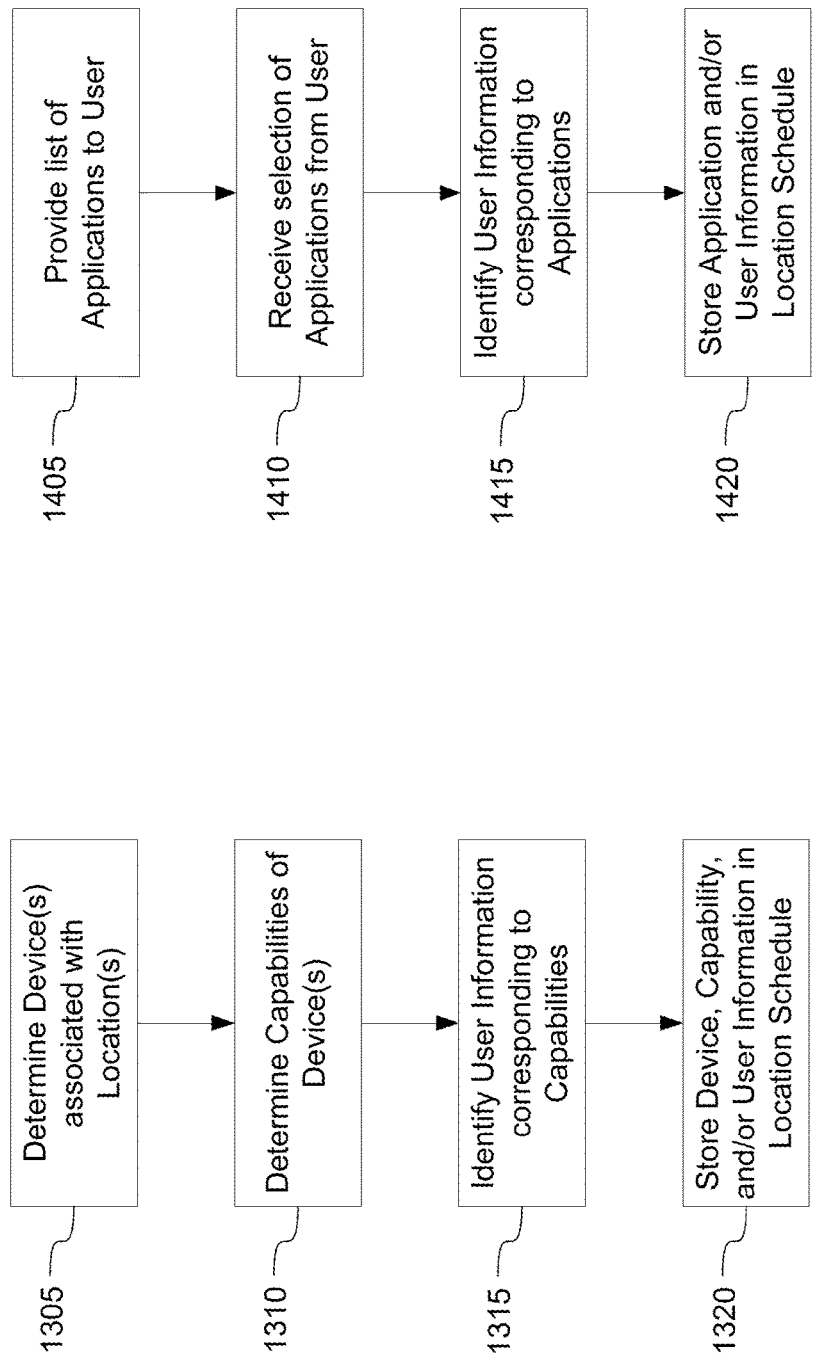

MOVEABLE STORAGE

This application is a continuation of U.S. patent application Ser. No. 14/816,787, filed Aug. 3, 2015, and entitled "Moveable Storage," which is a continuation of U.S. patent application Ser. No. 14/184,133, filed on Feb. 19, 2014 and issued Sep. 8, 2015 as U.S. Pat. No. 9,129,217, and entitled "Moveable Storage," which is a divisional of U.S. patent application Ser. No. 13/401,294, filed Feb. 21, 2012 and issued Apr. 15, 2014 as U.S. Pat. No. 8,700,666, and entitled "Moveable Storage." Each of the prior applications is herein incorporated by reference in its entirety for all purposes.

BACKGROUND

Users often travel or relocate to multiple geographical locations, and often require access to information that is stored at a common storage device located within one geographical location. For example, a user's electronic mail (e-mail) inbox content may be stored at a mail server in one geographic location. When the requesting user moves to a different geographical location, the delivery of that information may overload networks that facilitate movement of the information and cause excess delay. The following disclosure offers a system that delivers information to the user efficiently and cost-effectively as the user moves to different geographic locations.

BRIEF SUMMARY

Various features described herein may be used to implement a mobile or moveable storage system. The system, in one aspect, may include a processor and one or more non-transitory computer readable media storing instructions that, when executed by the processor, cause the processor to identify, for a user, a geographical location change from a first geographical location to a second geographical location, identify a routing path to route the user's information from a first storage device associated with the first geographical location to a second storage device associated with the second geographical location, and in response to identifying the geographical location change, transfer the user's information using the identified routing path.

In additional aspects, the system may implement a method that includes identifying a user's information and generating a location schedule for the user. In some aspects, the location schedule may process information identifying a first geographical location, a first time frame associated with the first geographical location, and a storage action associated with the first geographical location. In additional aspects, the storage action may identify a first cache storage. The location schedule may also process information identifying a user transition, a second time frame associated with the user transition, and a transfer action associated with the user transition. In some aspects, the transfer action may identify transfer of the user's information to the first cache storage. An aspect may also include using the location schedule to anticipate a geographical location change of the user and determining whether the first cache storage is available. In some aspects, the method may include in response to anticipating the geographical location change, moving the user's information to the first cache storage during the second time frame if the first cache storage is available. The method may also include, in some aspects, moving or replicating the user's information to temporary cache storage different from the first cache storage during the second time frame if the first cache storage is unavailable.

The foregoing is only a summary of some aspects, and these and other features are discussed further below.

DESCRIPTION OF THE DRAWINGS

Some features herein are illustrated by way of example, and not by way of limitation, in the figures of the accompanying drawings and in which like reference numerals refer to similar elements.

FIG. 5 illustrates an example method of identifying a location change of a user according to one or more aspects described herein.

FIG. 6 illustrates another example method of identifying a location change according to one or more aspects described herein.

FIG. 7 illustrates another example method of identifying a location change according to one or more aspects described herein.

FIG. 12 illustrates an example interface for providing and/or viewing a user location schedule according to one or more aspects described herein.

FIG. 13 illustrates an example method of identifying user information to store and/or transfer according to one or more aspects described herein.

FIG. 14 illustrates another example method of identifying user information to store and/or transfer according to one or more aspects described herein.

DETAILED DESCRIPTION

Figure 1:
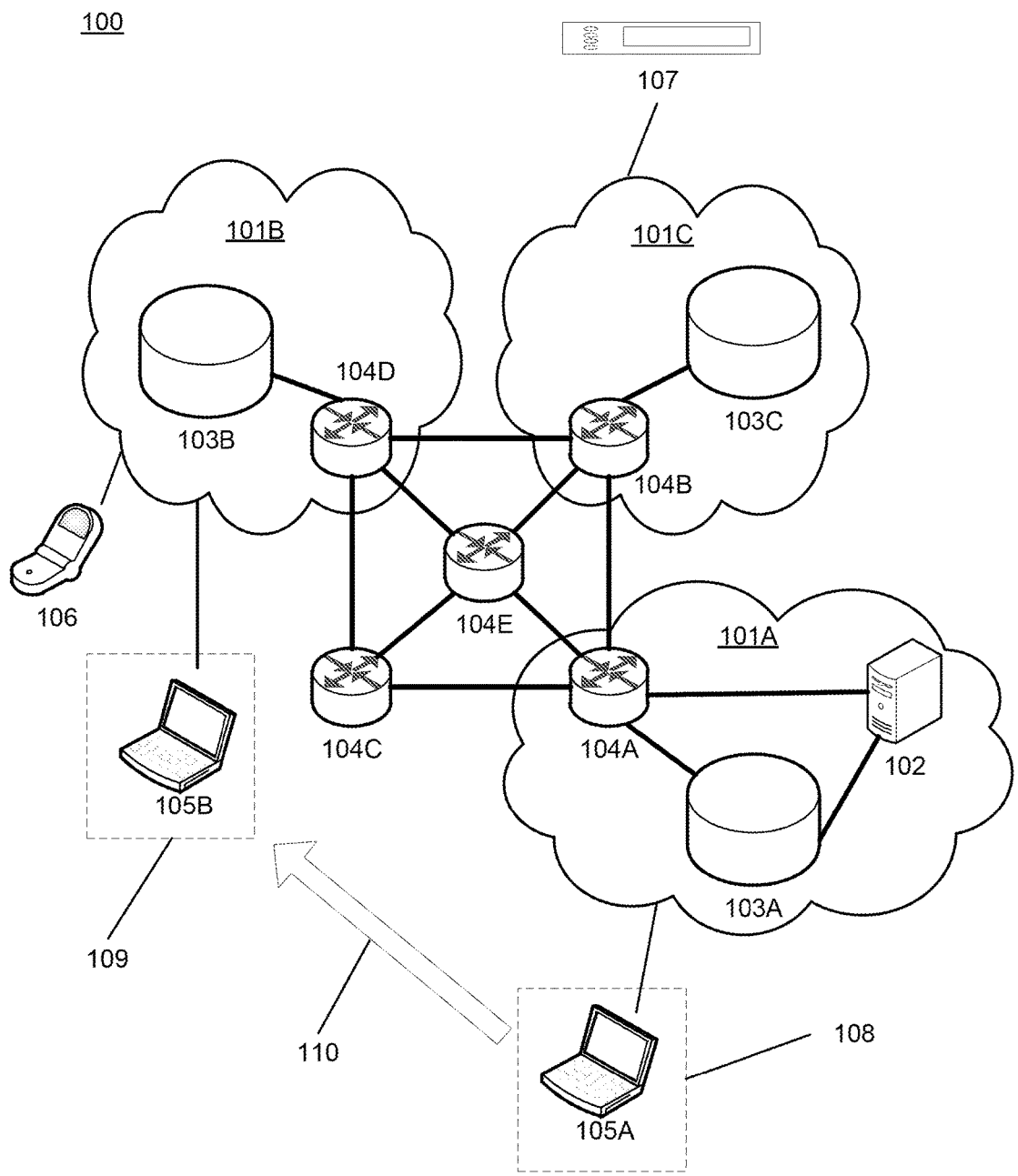
FIG. 1 illustrates an example of networks on which at least some of the various features described herein may be implemented.

FIG. 1 illustrates an example interconnection of networks on which at least some of the various features described herein may be implemented. Interconnected network 100 may include an interconnection of multiple networks, such as networks 101A-C. Networks 101A-C may be any type of information transmission network, such as satellite, telephone, cellular, wireless, etc. In some embodiments the network may be an optical fiber network, a coaxial cable network, or a hybrid fiber/coax (HFC) distribution network. Each of networks 101A-C may be located in different geographical locations, such as different service regions, zip codes, states, countries, etc. For example, one network may be located in one continent, such as North America, and another network may be located in a different continent, such as Europe. Similarly, one network may be located in one region of a country, such as the west coast of the United States, and another network may be located in a different region of the country, such as the east coast. Geographical boundaries may also be local, such as a boundary between a user's work office and home.

In some aspects of the disclosure, networks 101A-C may partially overlap in coverage (e.g., partially serve the same geographical location) or not overlap in coverage (e.g., serve distinct geographical locations). Interconnected network 100 may include an information database 102, such as a server, configured to store user information, including, but not limited to, data, files, content, such as video, audio or audiovisual content, etc. For example, a user's work information (e.g., data, e-mail inbox contents, business travel itinerary, database files, digital drawings, digital graphics, etc.) and/or personal information (e.g., data, personal photos, vacation travel itinerary, maps, online gaming settings, etc.) may be stored in a database 102. In some aspects of the disclosure, database 102 may serve as a common or "home" storage device for one or more users. For example, database 102 may store information accessible from or serving a location frequented by a user, such as the user's home, workplace, etc. Other locations, such as a user's local county, city, or district that the user lives in, works in, and/or visits often, may also serve as home locations. A user may have multiple home locations and/or storage devices, such as when the user splits his or her time (e.g., substantially equally) among multiple locations. In the example interconnected network of FIG. 1, database 102 is shown as being located in and/or serving network 101A.

Networks 101A-C may be associated with one or more additional storage devices 103A-C (e.g., memories, data servers, etc.). For example, storage device 103A may serve or be located within network 101A, storage device 103B may serve or be located within network 101B, and storage device 103C may serve or be located within network 101C. In some aspects of the disclosure, storage devices 103A-C may provide temporary storage of information for one or more users. For example, storage devices 103A-C may include cache storage (e.g., provided by a server) to allow quick access to user information for a local user. Storing information at one or more local storage devices 103A-C may also benefit the interconnected network 100 by reducing the number of network elements (e.g., nodes and/or communication lines) needed to serve an information request. In some aspects of the disclosure, storage devices 103A-C may store information (e.g., copies of information) stored in common database 102. For example, information stored in common database 102 may be copied to storage device 103B when a user moves to a geographical location served by network 101B and before the user requests it, to allow quicker access to the information when needed by reducing the need to traverse between networks 101B and 101A to retrieve the information. Storage devices 103A-C may include any type of computer-readable medium or memory including, but not limited to, read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Storage devices 103A-C may also include other non-volatile random access storage devices, such as hard disk drives.

Networks 101A-C may be connected by a series of interconnected communication lines (e.g., coaxial cables, optical fibers, wireless links, etc.) and nodes 104A-E. Nodes 104A-E may include network elements, such as computers, switches, routers, proxy servers, content filters, firewalls, satellites, and other computing elements that connect one or more communication lines and/or networks with one or more other communication lines and/or networks.

One or more devices, such as a user's laptop computer, may be connected to one of networks 101A-C. In some aspects of the disclosure, devices may change locations and connect to a different network, such as when a user changes locations. For example, a computing device 105, such as laptop, may be connected to network 101A during a first time frame, as indicated by dashed-line box 108. When computing device 105 changes locations (e.g., geographical locations) as indicated by arrow 110, computing device 105 may connect to a different network, such as network 101B, as indicated by dashed-line box 109. In some aspects of the disclosure, computing device 105 may change locations when a user associated with computing device 105 travels from one geographical location (e.g., a geographical location served by network 101A) to another geographical location (e.g., a geographical location served by network 101B). This may occur, for example, when a user relocates from a network (e.g., 101A) at a place of employment to a different network (e.g., 101B) at home.

Additional devices may be connected to one of networks 101A-C. For example, another computing device 106, such as a mobile phone, may be connected to network 101B as shown in FIG. 1. In some aspects of the disclosure, computing devices 105 and 106 may be associated (e.g., owned, used, etc.) with the same user. In some aspects of the disclosure, a user may access information, including personal or business information, data, files, etc., from either computing device 105 or computing device 106. Another computing device 107, such as a set-top box (STB), may be connected to network 101C as shown in FIG. 1. In some aspects of the disclosure, computing device 107 may include local storage (e.g., non-volatile memory) that may be used to temporarily store user information until a network storage device (e.g., one of storage devices 103A-C) becomes available. Computing devices 105-107 have been described as including a laptop, mobile phone, and STB. However, computing devices 105-107 may include any computing device capable of storing and/or accessing user information, such as a personal computer, digital video recorder (DVR), computer server, television, wireless devices (wireless laptops and netbooks, mobile phones, mobile televisions, personal digital assistants (PDA), tablet computers, etc.), and any other desired devices.

Figure 2:
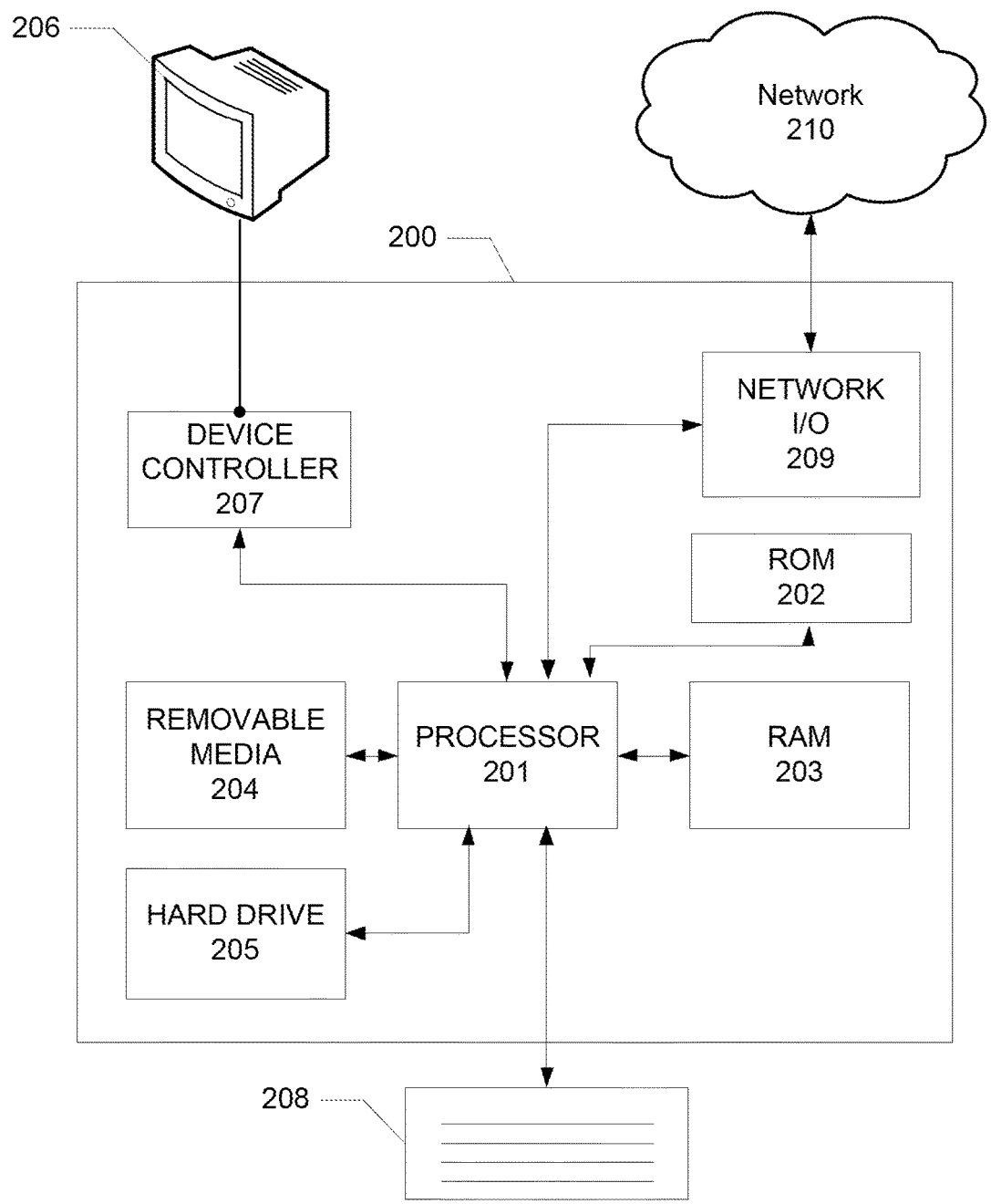
FIG. 2 illustrates an example computing device on which at least some of the various features described herein may be implemented.

FIG. 2 illustrates general hardware elements that can be used to implement any of the various computing devices discussed above and that will be discussed below. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

Figure 3:
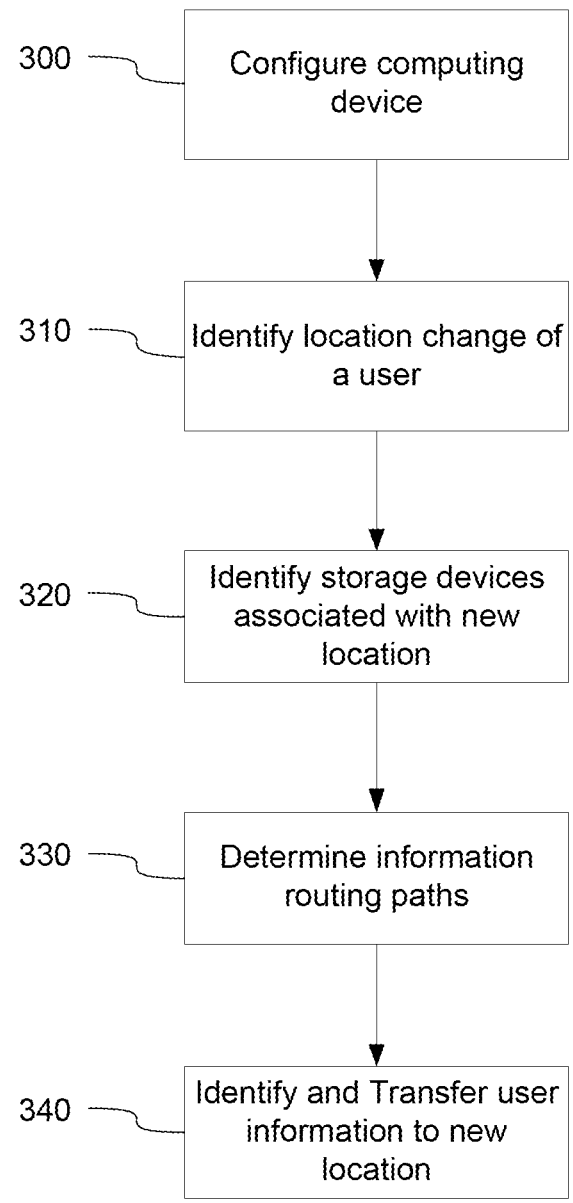
FIG. 3 illustrates an example method of transferring information to a new storage device according to one or more aspects described herein.

FIG. 3 illustrates an example overview method of transferring information to a new storage device according to one or more aspects described herein. One or more computing devices, such as computing device 200, may perform the method illustrated in FIG. 3. In step 300, a computing device may be configured with user preference information, such as information relating to a user's location schedule, information identifying storage device(s), information identifying routing path(s), and/or user information identifying data to transfer in response to a user location change. In step 310, the computing device may identify a location (e.g., geographical location) change of a user and/or user device. In step 320, the computing device may identify one or more storage devices associated with a new location, such as cache storage located within or near the new location. In step 330, the computing device may determine one or more routing paths to use to transfer (e.g., move, copy, synchronize, etc.) information from a storage device associated with the user's old location to a storage device associated with the user's new location. In step 340, the computing device may identify and transfer, using one or more routing paths, user information to the storage device associated with the user's new location. In some aspects of the disclosure, while a copy of the user information may be transferred to the new location, an original or a copy of the user information may also remain at the user's old location. The steps illustrated in FIG. 3 will be described in further detail in the examples below.

Figure 4:
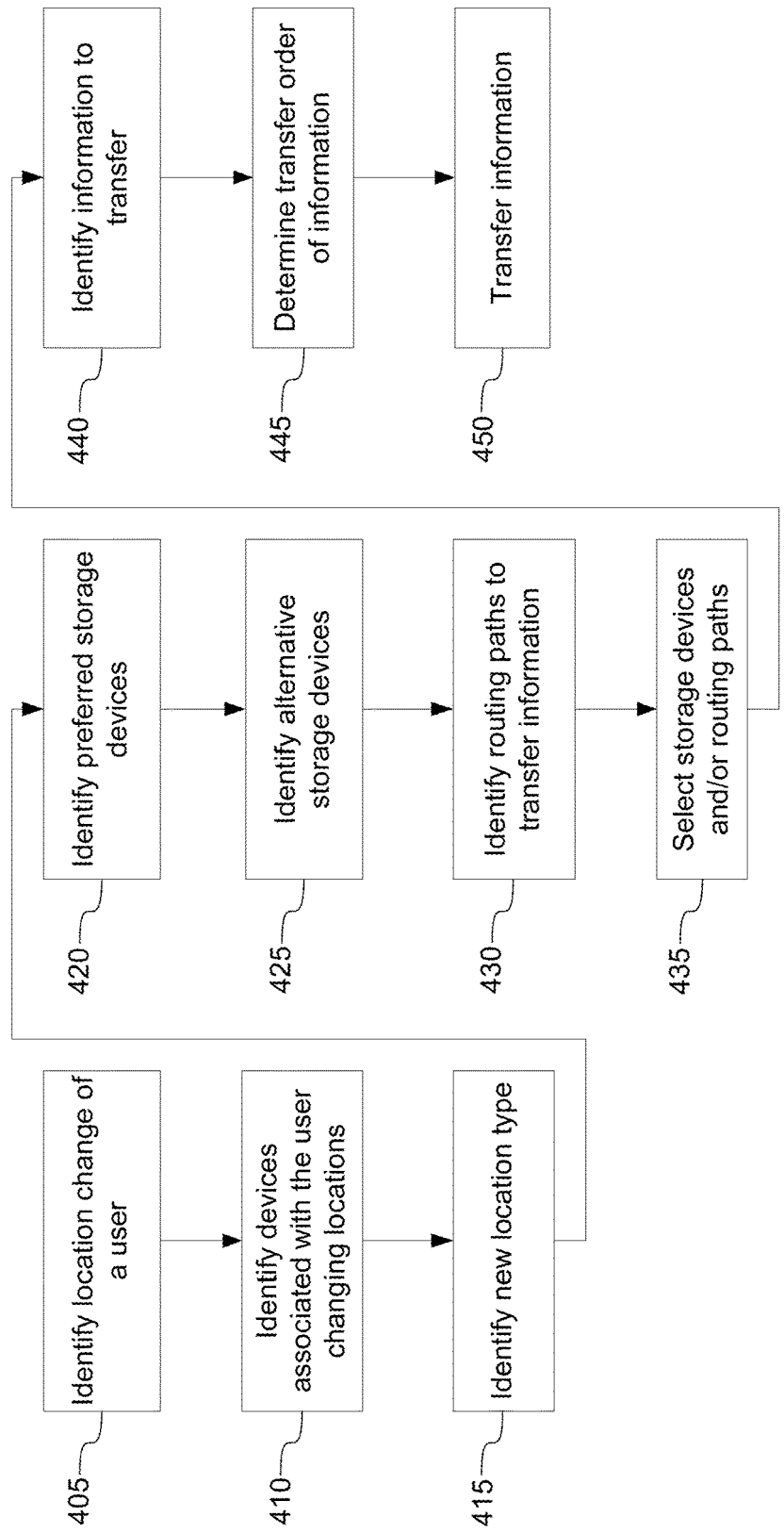
FIG. 4 illustrates an example method of transferring information to a new storage device according to one or more aspects described herein.

FIG. 4 illustrates an example method of transferring information to a new storage device according to one or more aspects described herein. In some aspects of the disclosure, the steps illustrated in FIG. 4 provide additional details to the steps illustrated in FIG. 3. In step 405, the computing device may identify a location change of a user and/or user device, such as a present or future (e.g., scheduled) location change. FIG. 5 illustrates an example method of identifying a location change based on user input according to one or more aspects described herein. In step 510, the computing device may receive location change information from a user, such as information entered through an interface of a computing device associated with the user. Location change information may include information identifying the user, information identifying an old (e.g., present or past) location, information identifying a new (e.g., present or future) location, and/or additional information related to the user and/or locations, and may be entered by the user or may be automatically determined by a computing device monitoring the user's previous movement and data usage habits. For example, the additional information may, in some embodiments, indicate a time duration that the user plans or is expected to be at the new location. Based on the time duration information, the computing device may determine whether to transfer the information and/or the length of time to store user information at a storage device associated with the new location. For example, if the computing device determines that the user plans to be at the new location for an extended period of time, such as more than one day, the computing device may cause the user's information to be transferred to storage device associated with the new location. On the other hand, if the computing device determines that the user plans to be at the new location for a short period of time, such as 10 minutes, the computing device may determine that transfer of the user's information might not be necessary (e.g., if the likelihood that the user will access information during the received time duration is low or if the cost to transfer and store the information at a storage device associated with the new location is higher than the cost to store and provide access to the information from a storage device associated with the old location). Additional information may also identify user information (e.g., data, content, etc.) to transfer to the storage device associated with the new location.

In step 520, the computing device may determine whether the received location change information indicates a present location change or a future location change. For example, a user may indicate a present location change by inputting and transmitting location change information to the computing device and requesting transfer of the user's information (e.g., data, content, etc.) after the user arrives at the new location. Alternatively (or in addition to), the user may indicate a future location change by transmitting location change information to the computing device and requesting transfer of information prior to the user changing locations, such as while the user is at the old location or is in transit to the new location. If the user indicates a present location change, the computing device may, in step 530, transfer the user's information to a storage device associated with the new location. If the user indicates a future location change, the computing device may, in step 540, request additional information from the user such as information identifying a preferred information transfer time or a planned location change time, if necessary. In some embodiments, if the user notifies the computing device of a location change prior to arriving at the new location, information associated with the user initiating the request may be transmitted to the new location prior to the user arriving at the new location, such as while the user is at the old location or while the user is in transit to the new location.

In some aspects of the present disclosure, a user might not need to notify the computing device of a location change (e.g., present, scheduled, or otherwise). FIG. 6 illustrates an example method of identifying a location change based on detecting movement of a device associated with the user according to one or more aspects described herein. When a user moves from a first location to a second location, the location of a device carried by the user may be determined based on, for example, GPS coordinates or a unique identity, such as an IP address, of the device. For example, in step 610, the computing device may determine the location of the device based on the access point (e.g., wireless or wired access point) or point of presence of the device. Based on the determined location, the computing device, in step 620, may identify the location (e.g., geographical location) of the user. Similarly, the computing device may determine the location of other devices associated with the user by detecting a location of a single device associated with the user.

The computing device may also identify a location change of a user and/or device by referencing a location schedule associated with the user and/or device. FIG. 7 illustrates an example method of identifying a location change based on a location schedule according to one or more aspects described herein. A location schedule may include information identifying users, users' scheduled locations, and time frames that users are expected to be at each scheduled location. Additional aspects of the location schedule, including functional data structure of the location schedule and methods of populating the location schedule, will be describe in further detail in the examples below. After determining that a location schedule exists, the computing device, in step 710, may access the location schedule (e.g., on command or periodically) and extract data stored therein. In step 720, the computing device may compare a current time (e.g., the time that the computing device accesses the location schedule) with one or more times and/or time frames included in the location schedule. Such time and/or time frames may include, for example, a start time, time duration, and/or an end time for each location identified in the location schedule (e.g., for a location of Philadelphia, a start time might be 8:00 AM, a time duration might be 9 hours, and an end time might be 5:00 PM). In step 730, the computing device may identify a location change of the user based on the comparison in step 720. For example, if the user's current location is identified as Los Angeles, but the current time is 8:05 AM, the computing device may determine that the user has changed his or her location to Philadelphia. In some embodiments, the computing device may also utilize a time buffer when identifying a location change, where the time buffer accounts for travel time between locations. For example, if a time buffer associated with Philadelphia is 30 minutes, the computing device may identify a location change to Philadelphia at 7:30 AM, to account for the fact that the user may have left the house by 7:30 AM in order to arrive in Philadelphia at the scheduled 8:00 AM time.

Figure 8:
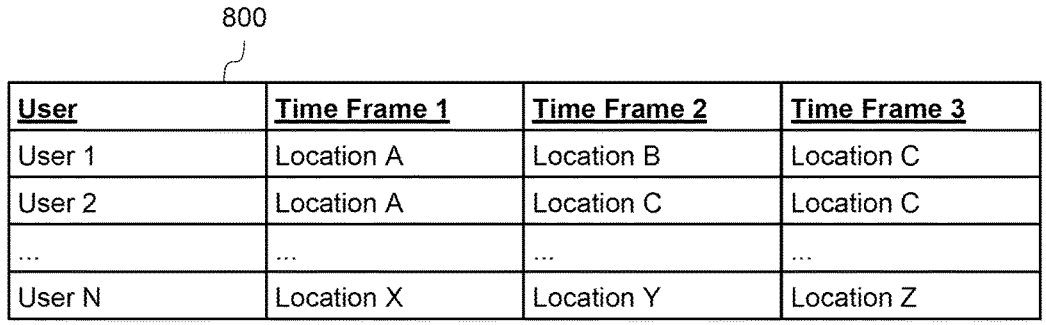
FIG. 8 illustrates an example user location schedule according to one or more aspects described herein.

FIG. 8 illustrates an example user location schedule 800 according to one or more aspects described herein. Schedule 800 may associate one or more users (e.g., users 1, 2, etc.) with one or more time frames (e.g., time frame 1, time frame 2, and time frame 3) and/or locations (e.g., geographical locations A, B, etc.). Alternatively, user entries in schedule 800 may be replaced or supplemented with device entries (e.g., replacement of "User 1" with "User 1 mobile phone") when a user (e.g., User 1) plans to bring some, but not all, of his or her devices (e.g., the user plans to bring a mobile phone, but not a laptop computer) to each location indicated in the schedule (e.g., locations A, B, etc.). User 1 and/or User 1 device 1 may be associated with (e.g., located within) a Location A during Time Frame 1, a Location B during Time Frame 2, and a Location C during Time Frame 3. Furthermore, each location may include multiple location elements, such as a geographical location of a user and/or device and a location of storage associated with the geographical location (e.g., location of one or more cache storages that serves the geographical location). Each time frame may include a period of time (e.g., represented in hours, days, weeks, months, etc.) that a corresponding user and/or device is expected to be at each of location. In schedule 800, for example, User 1 and/or User 1 device 1 might be expected to be at Location A (e.g., a geographical location of Philadelphia and an associated cache storage that serves Philadelphia) during a Time Frame 1 (e.g., Mondays through Wednesdays) and Location B (e.g., a geographical location of Los Angeles and an associated cache storage that serves Los Angeles) during a Time Frame 2 (e.g., Thursdays through Sundays). As illustrated in FIG. 8, schedule 800 may include location and time frame information for a plurality of users and/or devices.

Figure 9:
FIG. 9 illustrates another example user location schedule according to one or more aspects described herein.

FIG. 9 illustrates another example user location schedule 900 according to one or more aspects described herein. For example, schedule 900 may include information identifying locations, time frames, and/or actions for a user. Schedule 900 may also include information associating specific locations to specific time frames and/or actions. For example, schedule 900 may associate the location "Home" with the time frame "18:00-08:00" and an action "store information: storage 1." This entry, for example, might indicate that a user generally is or will be at "Home" from 6:00 PM to 8:00 AM and that information associated with the user (e.g., data, files, content, etc.) should be stored at storage 1, which may quickly and efficiently be accessed by the user while at home. Schedule 900 may similarly associate location "Work" with time frame "09:00-17:00" and an action "store information: storage 2." Schedule 900 may include additional schedule entries generally indicating that the user is not or will not be at any location served by storage or is relocating (e.g., commuting) from a first location (e.g., Home) to a second location (e.g., Work). For example, schedule 900 may associate location "Commute 1" with the time frame "08:00-09:00" and an action "Transfer information: storage 1→2." This entry in schedule 900 might indicate that the user is commuting from Home to Work from 8:00 AM to 9:00 AM and that the computing device should cause information to transfer from storage 1 (associated with the "Home" location) to storage 2 (associated with the "Work" location). For example, the computing device may cause the information to be transferred during a time frame when the user typically does not access the information, such as when the user is commuting. Information may also be transferred at a different time frame, such as at a particular time period within the time frames associated with Home and/or Work when the user is not or is not expected to access the information, such as at 3:00 AM (when the user is at Home) or near the end of the time frame associated with the Work Location (e.g., 4:30 PM when the user is not expected to access the information).

Alternative (or in addition) to using the location schedule to identify a transfer time, the computing device may determine a time frame to transfer the user's information by monitoring the user's movements. For example, if the schedule entry indicates to transfer information from storage 1 (e.g., associated with Home) to storage 2 (e.g., associated with Work), the computing device may cause the information to begin transferring when the computing device detects that the user has left Home (e.g., a device associated with the user disconnects from a network servicing Home, the user provides input indicating that he or she is leaving Home, etc.). Action entries may additionally identify information to be stored and/or transferred. Identification of such information will be described in further detail in the examples below with respect to the description of steps 440, 445, and 450. Schedule 900 may also associate a location "Commute 2" with a time frame "17:00-18:00" and an action "transfer information storage 2→1," in order to identify that information associated with the user should be transferred from storage associated with the Work location (e.g., storage 2) to storage associated with the Home location (e.g., storage 1) during the time frame for Commute 2.

Although schedule 900 has been described with respect to home and work locations, schedule 900 may include entries for any location from which the user might access his or her information. For example, schedule 900 may include entries for a user's main work office as well as the user's satellite work office. Schedule 900 may similarly include entries for many offices and/or locations, such as locations that an employee is planning to visit during a business trip. Schedule 900 may also include vacation location entries, such as when a user might access his or her work and/or personal information during vacation.

Figure 10:
FIG. 10 illustrates an additional example user location schedule according to one or more aspects described herein.

FIG. 10 illustrates an additional example user location schedule 1000 according to one or more aspects described herein. Similar to location schedule 900, location schedule 1000 may include information identifying and associating Locations, Time Frames, and/or Actions. For example, schedule 1000 may associate the location "Philadelphia" with the time frame "Monday-Friday" and an action "store information: storage 1." This entry might, for example indicate that a user generally is or will be in Philadelphia during an upcoming or every Monday-Friday and that information associated with the user (e.g., data, files, content, etc.) should be stored at storage 1, which may quickly and efficiently accessed by the user while in Philadelphia. Schedule 1000 may similarly associate location "Los Angeles" with time frame "Saturday-Sunday" and an action "store information: storage 2." Schedule 1000 may include additional entries for additional locations the user is or will be located. Similar to schedule 900, schedule 1000 may include additional entries generally indicating that the user is not or will not be at any location served by storage or is relocating (e.g., commuting) from a first location (e.g., Home) to a second location (e.g., Work). For example, schedule 1000 may associate location "Commute 1" with the time frame "Friday, 18:00-23:00" and an action "Transfer information: storage 1→2." This entry in schedule 1000 might indicate that the user is commuting from Philadelphia to Los Angeles from 6:00 PM to 11:00 PM. A commute entry in Schedule 1000 may indicate that the user might not access or is less likely to access data during the time frame associated with a commute entry (e.g., a downtime). In some aspects of the disclosure, information may be transferred when the user might not access or is less likely to access the information, such as when the user is commuting. For example, a "Transfer information: storage 1→2" action may indicate that the computing device causes information from storage 1 (associated with the "Philadelphia" location) to be transferred to storage 2 (associated with the "Los Angeles" location) because the user is unlikely to access networked data while traveling, such as by airplane, from Philadelphia to Los Angeles. The mode of commute (e.g., airplane, car, etc.) may be identified in the schedule, such as in the action entry field. In addition to transferring the user's information, the information may additionally be backed up or otherwise copied to a storage device, such as a backup server or other redundant location, during a downtime. As will be described in further detail in the examples below with respect to the description of step 430, the mode of commute may be used to determine routing paths to use to transfer information.

Figure 11:
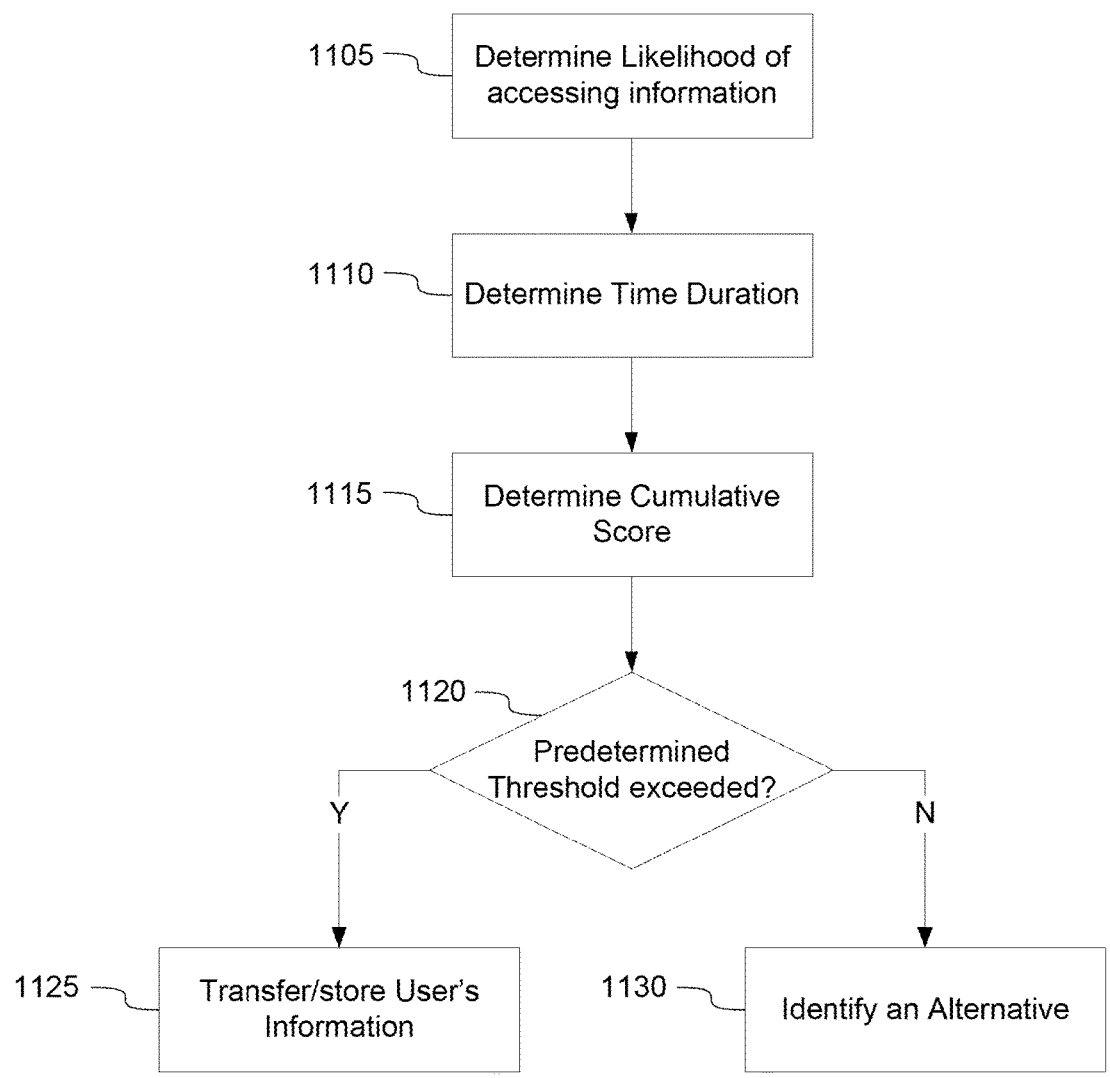
FIG. 11 illustrates an example method of determining whether to store and/or transfer information according to one or more aspects described herein.

FIG. 11 illustrates an example method of determining whether to store and/or transfer information (or otherwise perform an action indicated in a location schedule) according to one or more aspects described herein. For example, the computing device may consider factors including the likelihood that the user will access information at a new location and/or the time duration that the user is expected to be at the new location. In step 1105, the computing device may determine the likelihood that a user will access information at a location and/or during a time frame. In some aspects of the disclosure, information indicating likelihood may be included in a location schedule, such as schedule 1000, such that the computing device may determine the likelihood by referencing the location schedule. The likelihood may be indicated in the schedule, for example, as a percentage (e.g., 80% likelihood of the user accessing information), a rating (e.g., on a scale of 1 to 10, 10 being most likely and 1 being least likely to access information, a rating indicator of 8), or any other indicator that indicates the likelihood that the user is or will access information at a particular location and/or time frame. For example, the location of Philadelphia and/or the time frame of Monday-Friday may be associated with a 90% likelihood of the user accessing information while at the location. Similarly, the location of Los Angeles and/or the time frame of Saturday-Sunday may be associated with a 5% likelihood of the user accessing information while at the location. These likelihoods may be the case if the information includes, for example, business documents typically accessed by the user at work while in Philadelphia, but not at home while in Los Angeles.

In step 1110, the computing device may determine the time duration that the user is expected to be at a new location. In some aspects of the disclosure, information indicating time duration may be included in a location schedule, such as in a "Time Frame" entry in schedule 1000, so that the computing device may determine the time duration by referencing the location schedule. In some examples, the longer the indicated time duration (e.g., at least one hour in a location schedule that tracks a user's daily movement, at least one day in a location schedule that tracks a user's weekly movement, etc.), the greater the chances the user will access information and the higher the benefit to cost ratio of transferring will be. For example, a user expected to be at a location for only 10 minutes might not access certain information, such as business documents. Similarly, the benefit to cost ratio of transferring information may be low if the user is expected to be at the location for 10 minutes. The low benefit to cost ratio may be attributable to, for example, the low likelihood that the user will access the information during a 10 minute time duration, the proximity of the new location to the old location (e.g., a 10 minute visit to a new location might indicate that the new location is close to an old location, where information is presently stored), and the high costs associated with transferring and/or storing information at a new storage device given a short 10 minute visit.

In step 1115, the computing device may determine a cumulative score for transferring, storing, and/or otherwise carrying out an action indicated in a location schedule by factoring in the likelihood that the user will access information at a location and the time duration that the user is expected to be at the new location. The computing device may apply appropriate weights when determining the cumulative score, such as giving more weight to a more important factor (e.g., one of likelihood of access and time duration). The computing device may also consider both factors, but individually and sequentially. For example, the computing device may first determine that the likelihood of access indicated in the schedule is sufficient (e.g., greater than a predetermined threshold for likelihood). In response to determining that the likelihood is sufficient, the computing device may determine whether the time duration factor is met (e.g., greater than a predetermined threshold for time duration) to determine whether to carry out an associated action indicated in the schedule. The computing device may also consider factors individually. For example, the action associated with Philadelphia (e.g., store information: storage 1) may be carried out by the computing device because of a high likelihood (e.g., 90%) that the user will access the information in Philadelphia. On the other hand, the action associated with Los Angeles (e.g., store information: storage 2) might not be carried out by the computing device because of the low likelihood (e.g., 5%) that the user will access the information in Los Angeles. A similar determination may be made, independently, for the time duration factor.

In step 1120, the computing device may determine whether an individual or cumulative score exceeds a predetermined threshold. In some embodiments, a predetermined threshold for the likelihood indicator may be used to determine whether to carry out the associated action. For example, where the threshold is 20% (e.g., above 20%=carry out the associated action), the action of "Store information: storage 1" may be carried out, in step 1125, because 90% likelihood associated with the location of Philadelphia exceeds the threshold. On the other hand, the action of "Store information: storage 2" might not be carried out, as indicated in step 1130, because 5% likelihood associated with the location of Los Angeles does not exceed the threshold of 20%. Instead, the computing device may identify an alternative action to perform. For example, the computing device may send a message to the user indicating that the user's information will not be transferred and provide the user with an option to override the determination. As another example, the computing device may remove the action associated with the location from the location schedule and request, from the user, a different action to perform for the associated location and/or time frame.

In other embodiments, a predetermined threshold for time duration may be used to determine whether to carry out the associated action. For example, where the threshold is 3 days (e.g., visit is longer than 3 days=carry out the associated action), the action of "Store information: storage 1" may be carried out because a 5 day duration associated with the location of Philadelphia exceeds the threshold. On the other hand, the action of "Store information: storage 2" might not be carried out because a 2 day duration associated with the location of Los Angeles does not exceed the threshold of 3 days.

In additional embodiments, the computing device may consider factors cumulatively and compare a cumulative score to a predetermined cumulative threshold. For example, in a points system, each percentage point above a likelihood of access threshold may be one point, and each percentage point below a likelihood of access threshold may be negative one point. Similarly, each day above a time duration threshold may be one point, and each day below a time duration threshold may be negative one point. For the action of "Store information: storage 1" (associated with Philadelphia), if the likelihood of access is 90%, and the likelihood of access threshold is 20%, the difference is 70%, and the computing device may assign 70 points for the likelihood of access corresponding to "Store information: storage 1." Similarly, if the expected time duration at Philadelphia is 5 days and the time duration threshold is 3 days, the difference is 2 days, and the computing device may assign 2 points for the time duration corresponding to Philadelphia. Assuming a cumulative threshold of 0 points, the cumulative score, 72 points in this example, exceeds the cumulative threshold. Accordingly, the computing device may determine to carry out the "Store information: storage 1" action (associated with Philadelphia). On the other hand, for the action of "Store information: storage 2" (associated with Los Angeles), if the likelihood of access is 5%, and the likelihood of access threshold is 20%, the difference is −15%, and the computing device may assign −15 points for the likelihood of access corresponding to "Store information: storage 2." Similarly, if the expected time duration at Los Angeles is 2 days and the time duration threshold is 3 days, the difference is −1 days, and the computing device may assign −1 points for the time duration corresponding to Los Angeles. Assuming a cumulative threshold of 0 points, the cumulative score, −16 points in this example, does not exceed the cumulative threshold. Accordingly, the computing device may determine not to carry out the "Store information: storage 2" action (associated with Los Angeles).

Returning to FIG. 10, in addition to including information identifying the likelihood of accessing data, schedule 1000 may also include information identifying a plurality of actions and associating these actions with a location and/or time frame. For example, location Commute 1 may include a first action "Transfer information: storage 1→2" and a second action "Store information: storage 3," where storage 3 may include a storage device located between (e.g., intermediate to) location Philadelphia (or storage 1) and location Los Angeles (or storage 2). For example, storage 3 may be a temporary storage device associated with a location in Denver or any other location intermediate to Philadelphia and Los Angeles, including an airport that the user departs from and/or arrives at if the user commutes by airplane. In some aspects of the disclosure, a predetermined likelihood of accessing data may be used by the computing device to determine which of a plurality of actions to take. For example, the computing device may perform one action if the likelihood indicator exceeds the predetermined threshold and/or perform another action if the likelihood indicator does not exceed the predetermined threshold. For example, if the likelihood of accessing information during commute 1 is 5%, the computing device may perform the first action of "Transfer information: storage 1→2" because the user is unlikely (relative to a predetermined threshold of, for example, 20%) to access the data. On the other hand, if the likelihood of accessing information during commute 1 is 40%, the computing device may perform the second action of "Store information: storage 3" because the user's likelihood of accessing data during commute 1 is greater than the predetermined threshold of 20%.

Instead of storing information at an intermediate location, computing device may perform any other action that generally preserves the accessibility of information during an associated time frame. For example, the computing device may continue to store the information at storage 1 during Commute 1 until the user arrives in Los Angeles, at which time the computing device may cause the information to be transferred to storage 2. Alternatively (or in addition to), the computing device may cause information or a subset of information to be automatically stored locally on the user's device prior to or during a particular location and associated time frame, such as Commute 1 and Friday, 18:00-23:00, respectively. For example, the computing device may cause information to be downloaded from a storage device (e.g., storage 1) to the user's device (e.g., a laptop) prior to and/or near the start of Commute 1 (e.g., Friday, 18:00-23:00). Local storage may be beneficial when the user does not have access (or has limited access) to a network and/or storage device, such as when the user is travelling by airplane during Commute 1. Similarly, the computing device may cause information to be stored at intermediate storage devices that preserve the user's access to information during a flight. For example, if the flight includes in-air network access (e.g., via a wireless network in the airplane), in-air access capability may be indicated in schedule 1000, and the computing device may cause information to be stored at storage devices that serve the in-air network, such as at storage devices serving the departure or arrival airport, storage devices serving the airline hub, storage devices serving cellular ground towers that communicate with the in-air network, and/or storage devices serving satellites that communicate with the in-air network.

The computing device may perform multiple actions for each location and/or time frame. For example, in location Commute 1 (e.g., time frame Friday, 18:00-23:00), the computing device may cause information to be downloaded to the user's device as well as cause the information to be transferred from storage 1 to storage 2. Upon arrival, the information stored on the user's device and the information transferred to storage 2 may be synchronized. In some aspects of the disclosure, the information downloaded to the user's device and the information transferred from storage 1 to storage 2 need not be the same information. For example, information downloaded to the user's device may include a subset of the information transferred from storage 1 to storage 2, such as when the amount of information to transfer is large. This feature may be beneficial, for example, when the user device does not have enough local storage to store all of the transferred information or when the user will access only a subset of the information during Commute 1.

The computing device may create entries (e.g., user, location, time frame, action) for schedules 800, 900, and/or 1000 based on a user's prior location history. For example, the computing device may monitor and log the user's locations by receiving location information from the user's device(s) (e.g., based on GPS tracking) and/or from one or more networks or network devices (e.g., based on the user's network access points). The user's locations may be monitored during a predetermined time period in order to create accurate location, time frame, and action entries for a user. In some aspects of the disclosure, the predetermined time period may be longer than a time period to be included in the location schedule, such that multiple iterations of the time period to be included in the location schedule may be analyzed to provide an accurate entry. For example, the computing device may monitor the user's locations for a workweek if the location schedule includes entries that span a workday, such that the computing device factors in five days into predicting the user's schedule and creates schedule entries therewith. In other examples, the computing device may monitor the user's information (e.g., data, content, etc.) usage during a predetermined time period in order to create accurate location, time frame, and action entries for a user. Similar to monitoring the user's locations, monitoring the user's information usage may span a time period longer than a time period to be included in the location schedule. For example, the computing device may monitor the user's information usage for a workweek if the location schedule includes entries that span a workday. Based on the usage information, the computing device may populate the location schedule with location, time frame, and action information. In some aspects of the disclosure, the computing device may create an entry if the user accesses information more than a predetermined threshold number of times. For example, if the computing device determines that a user accesses Spreadsheet A between 8:00 AM and 5:00 PM, while the user is in Philadelphia, for 4 out of 5 monitored days (e.g., 80% of the time), the computing device may create an entry for Philadelphia, an associated time frame of 8:00 AM-5:00 PM, and an associated action of transfer Spreadsheet A to Philadelphia (e.g., either prior to the start of or during the time frame). The computing device may also create an entry if the user modifies information more than a predetermined threshold amount. For example, if the computing device determines that a user modifies Spreadsheet A more than a predetermined threshold amount (e.g., more than 10% of the data fields or file size of Spreadsheet A modified) between 8:00 AM and 5:00 PM, while the user is in Philadelphia, the computing device may create an entry for Philadelphia, an associated time frame of 8:00 AM-5:00 PM, and an associated action of transfer Spreadsheet A to Philadelphia (e.g., either prior to the start of or during the time frame). The computing device may also create the entry if the user modifies Spreadsheet A more than a predetermined threshold amount and accesses Spreadsheet A more than a predetermined threshold number of times.

After identifying user schedule information based on monitoring the user's location and usage history, the computing device may enter into a user location schedule (e.g., schedule 900) the location of a user (e.g., based on a previously detected position of one or more devices associated with the user), a time frame, and an action (e.g., store information: storage 1). In some aspects of the disclosure, the computing device may remove adjacent location entries having the same action and/or storage device identifier, such as where the adjacent location entries are close in proximity to one another. For example, if a storage device for a first user location (e.g., Philadelphia, Pa.) associated with a first time frame (e.g., 08:00-18:00) is storage 1 (e.g., temporary cache storage device associated with a first user location) and a storage device for a second user location (e.g., King of Prussia, Pa.) associated with a second time frame following the first time frame (e.g., 18:30-07:30) is also storage 1, the computing device may remove one of the entries for the first user location and the second user location and associate both user locations with the same storage device. Additionally, the computing device may remove intermediate information transfer entries (e.g., location Commute 1 and action Transfer information: storage 1→1) to prevent the computing device from attempting to transfer information when a transfer would be unnecessary (e.g., where the storage device does not change, or the change would be miniscule, such as where a user and/or storage device and a subsequent user and/or storage device are within 100 miles of one another). The computing device may also remove location entries based on any number of factors or combinations thereof, including the distance between locations, the amount of information to transfer, the frequency of access of the information, network latency, and network capacity. For example, the computing device may remove adjacent and/or intermediate location entries if the distance between the locations is low, the amount of information to transfer is low, the frequency of access of the information is low, the network latency associated with the later location entry is high, and/or the network capacity associated with the later location entry is low.

In some aspects of the disclosure, users may manually view and/or create entries for a location schedule. FIG. 12 illustrates an example interface 1200 for providing and/or viewing a user location schedule according to one or more aspects described herein. For example, a user may enter location, time frame, and/or action information into graphical user interface 1200. Subsequently, the user may submit the schedule information to be entered into a schedule (e.g., schedule 1000) by pressing a "Submit" or equivalent button. For example, to create the first entry in schedule 1000, a user may enter "Philadelphia" into the Location entry field, "Monday-Friday" in the Time Frame entry field, and "Store information: storage 1" into the Action field and press the "Submit" button. Alternatively (or in addition to), interface 1200 might also include pull-down menus or other lists for a user to select location, time frame, and action information.

In some aspects of the disclosure, the user might not provide an entry for the "Action" field. Instead, the computing device might determine the appropriate action for each location and/or time frame and populate the schedule (e.g., schedule 1000) accordingly. For example, in schedule 1000, a user may provide, through interface 1200, a "Philadelphia" location and time frame Monday-Friday entry and a "Los Angeles" location and time frame Saturday-Sunday entry. The computing device may receive and populate schedule 1000 with these entries, as well as automatically determine and populate remaining fields accordingly. For example, the computing device may determine storage devices (e.g., temporary cache storage devices) for Philadelphia and Los Angeles and populate the action fields for Philadelphia and Los Angeles accordingly (e.g., store information: storage 1 for Philadelphia and store information: storage 2 for Los Angeles). The computing device may also automatically create additional location/time frame/action entries for intermediate locations (e.g., intermediate to Philadelphia and Los Angeles). For example, the computing device may create the following entries based on the user providing entries for Philadelphia and Los Angeles: Commute 1/F, 18:00-23:00/Transfer information: storage 1→2 and Commute 2/Su, 12:00-19:00/Transfer information: storage 2→1. In this example, a user need not provide all location entries to the computing device.

In addition to creating schedule entries, users may view schedules in interface 1200 by pressing a "View Schedule" or equivalent button. Interface 1200 may also include a "More options" or equivalent button to bring the user to another user interface that provides the user with additional entry and/or view options, as will be described in further detail in the description of FIG. 15.

Returning to FIG. 4, in step 410, the computing device may optionally identify a location change of devices associated with a user changing or scheduled to change locations. Identifying devices that change and/or are expected to change locations may be useful in identifying information (e.g., data, content, files, etc.) to transfer. FIG. 13 illustrates an example method of identifying user information to store and/or transfer according to one or more aspects described herein. In step 1305, the computing device may determine device(s) associated with one or more location(s), such as by detecting the position of a device, requesting the information from a user, and/or referencing a location schedule. For example, the computing device may identify a location change for a mobile phone (e.g., by detecting the position of the mobile phone), but not a location change for a laptop, such as when a user that changes locations carries his or her mobile phone, but not a laptop. In step 1310, the computing device may determine the capabilities of the identified devices, including determining the types of files accessible by one or more applications installed on the user device. For example, a mobile phone might not be capable of accessing spreadsheet documents (e.g., the mobile phone lacks an application configured to open spreadsheet documents), but may be capable of accessing video content (e.g., the phone includes an application configured to open and/or play video content). In step 1315, the computing device may identify user information (e.g., data, content, etc.) corresponding to the identified user device(s) and/or capabilities (e.g., applications installed on user device(s)). Such information may include information that may be accessed, opened, modified, etc. by one or more application installed on the user device(s). In step 1320, the computing device may store identifiers for devices, capabilities, and/or user information to be transferred in a location schedule (e.g., indicators for video content for Los Angeles and indicators for spreadsheet documents for Philadelphia). Based on the stored identifiers, the computing device may determine (e.g., in step 440, as will be described in further details in the description below) that video content should be transferred to the new storage device, but not spreadsheet documents when a user commutes from Philadelphia to Los Angeles.

FIG. 14 illustrates another example method of identifying user information to store and/or transfer according to one or more aspects described herein. In some aspects of the disclosure, a user may identify applications that the user intends to use at the new location, and the computing device may determine user information corresponding to the applications and transfer the information to the new storage device, accordingly. For example, in step 1405, the computing device may provide a list of applications to the user (e.g., through a GUI of a device associated with the user) for each location. Subsequently, in step 1410, the computing device may receive a selection of applications for each location from the user. For example, the computing device may receive a selection of EXCEL™, WORD™, and VISIO™ for Philadelphia, and a selection of XFINITY TV PLAYER™ and ITUNES™ for Los Angeles. Based on the selection, the computing device, in step 1415, may identify information to transfer for each location identified in a location schedule (e.g., transfer to Los Angeles information that XFINITY TV PLAYER™ and ITUNES™ are configured to access/open). In step 1420, the computing device may indicate the information to transfer and/or associated application by storing identifiers in the location schedule.

Alternatively (or in addition to), information may be pre-marked with identifiers for one or more devices, such that a location change of the one or more devices may cause information with a corresponding pre-mark identifier to be transferred. For example, video 1 may include (e.g., in a header, identifier, or other data field) information identifying a mobile phone 1 and a laptop 1. Subsequently, when one or both of mobile phone 1 and laptop 1 change locations, the computing device may identify video 1 (e.g., in step 440) to be transferred to the new storage device. The computing device may populate a user schedule (e.g., one of schedules 800, 900, or 1000) with information associating a location with one or more user devices and access the information to identify information to be transferred.

In step 415, the computing device may optionally identify the location type for one or more locations associated with a user. In schedule 1000, for example, location Philadelphia may be identified as a work location, and location Los Angeles may be identified as a home location. Accordingly, the computing device may provide work-related information (e.g., work documents, spreadsheets, etc.) to a storage device associated with Philadelphia when the user is in Philadelphia and home-related information (e.g., movie content, music content, etc.) to a storage device associated with Los Angeles when the user is in Los Angeles. Similarly, the computing device may associate information associated with each location type with one or more locations.

Figure 15:
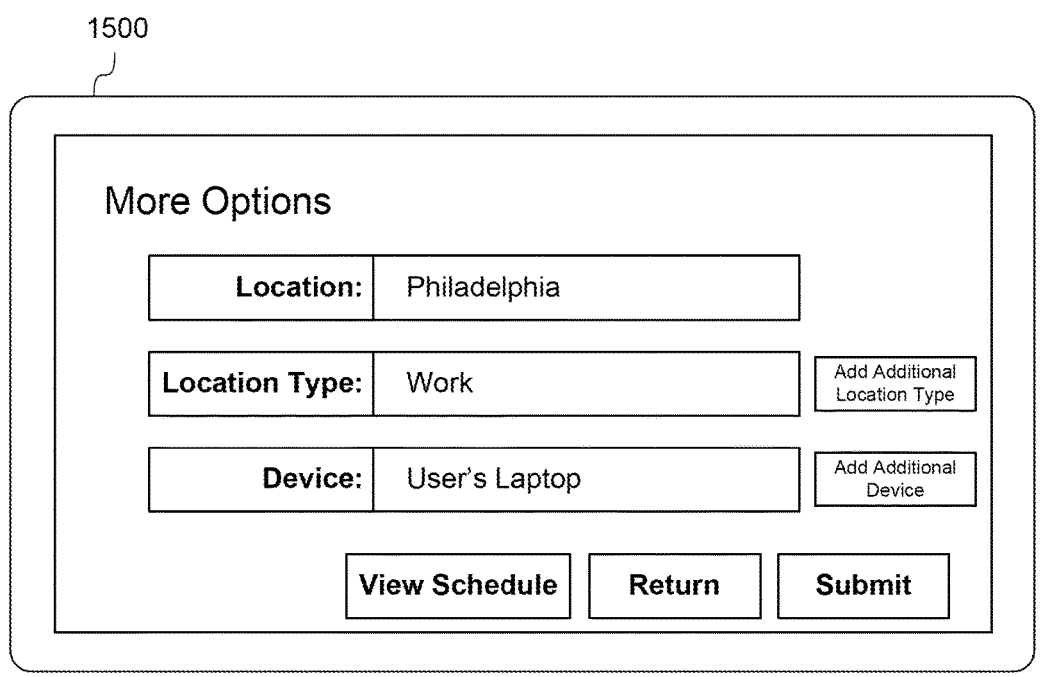
FIG. 15 illustrates another example interface for providing and/or viewing a user location schedule according to one or more aspects described herein.

FIG. 15 illustrates another example interface 1500 for providing and/or viewing a user location schedule according to one or more aspects described herein. In some aspects of the disclosure, a user may provide information associating one or more location types and/or devices with a location. For example, in the "More Options" or equivalent user interface 1500 (accessed by pressing, for example, a "More Options" button in interface 1200), a user may enter location information, location type information, and device information. For example, a user may identify that location Philadelphia is a work location, and that a laptop will be used to access information while in Philadelphia. The user may add additional location types and/or devices by pressing the "Add Additional Location Type" or equivalent or the "Add Additional Device" or equivalent in interface 1500. Furthermore, interface 1500 may include pull-down menus or other lists for a user to select location, location type, and/or device information. After providing information in interface 1500, a user may press the "Submit" or equivalent button to submit the information for processing by the computing device (e.g., to populate one or more schedules with submitted information). Interface 1500 may optionally include a "View Schedule" or equivalent button for a user to view a location schedule. Interface 1500 may also optionally include a "Return" or equivalent button to return the user to interface 1200. In some aspects of the disclosure, the Location entry field may be prepopulated. For example, the Location field may be prepopulated with a location entry included in one of the user's schedules. A user may adjust the prepopulated location field by selecting a different location, such as by actuating a pull-down menu. The Location field may also be prepopulated with a location entry provided, for example, by the user in interface 1200.

Figure 16:
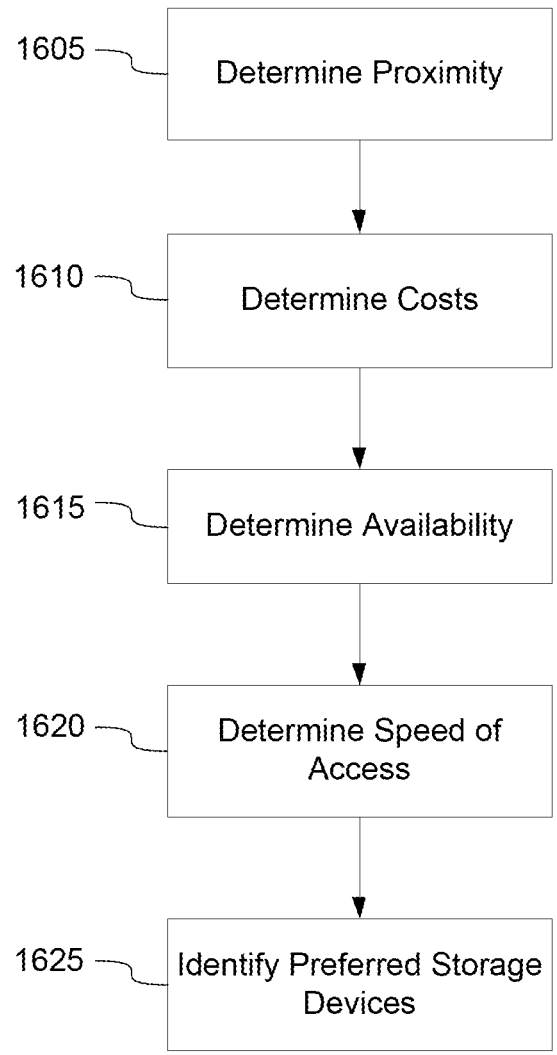
FIG. 16 illustrates an example method of identifying a storage device according to one or more aspects described herein.

Returning to FIG. 4, in step 420, the computing device may identify preferred storage devices for user information. The computing device may consider one or more factors to identify a preferred storage device. FIG. 16 illustrates an example method of identifying a storage device according to one or more aspects described herein. For example, the computing device, in step 1605, may consider the proximity (e.g., closeness) of the storage device to a user's new geographical location. Proximity may include, for example, a physical proximity, such as a geographical proximity of a user location to an identified storage device. Proximity may also include, for example, a network proximity, which may be identified by bandwidth availability and latency associated with the network and/or identified storage device serving the user's new geographical location.

In step 1610, the computing device may also consider costs associated with the storage device to identify one or more storage devices as preferred storage devices. In some aspects of the disclosure, cost may include monetary cost of storing user information at the storage device. For example, a service provider for a first new storage device (e.g., a service provider that owns, operates, manages, etc. a storage device) and an old or common (e.g., "home") storage device may be the same, whereas a service provider for a second new storage device might be different from the service provider for the old storage device. In this example, the computing device may determine that the first new storage device costs less than the second new storage device and factor in the cost difference accordingly to identify one or more preferred storage devices. Costs may also be predetermined (e.g., as price per byte per day) and made available to the computing device, such as through a web service that publishes the predetermined storage device costs.

In step 1615, the computing device may also consider availability of one or more storage devices to identify one or more storage devices as a preferred storage device. For example, one or more servers (e.g., database server, file server, etc.) may be preselected (e.g., by a computing device managed by a service provider) to serve as a storage device for users (e.g., customers of the service provider). The computing device may use pre-selection to identify a preferred storage device (e.g., by giving more weight to pre-selected servers than to non-preselected servers). Alternatively, the computing device may automatically identify preselected servers as preferred storage devices. In a related example, one or more storage devices may nominate itself as a new storage device. For example, if a user changes locations, one or more storage devices may discover the user and/or user device and nominate itself as a storage device for the user's information (e.g., via a discovery process when a user device enters a new geographical region and connects to a network). Availability of one or more storage devices may also be identified by the amount of storage space available at the one or more storage devices (e.g., percentage of storage space available/used, amount of storage space available, etc.). For example, the computing device may determine that one or more storage devices are available if there is sufficient network capacity for the user to reliably access information from the one or more storage devices.

In step 1620, the computing device may also consider speed of access to information stored at a storage device (e.g., based on latency, bandwidth, computing power, etc.). For example, the computing device may determine latency associated with transferring user information from a storage device to a requesting user device. Similarly, the computing device may identify bandwidth restrictions for one or more storage devices and/or information routing paths used to transfer information from the storage device to the requesting user device. In some aspects of the disclosure, the type of network (e.g., optical fiber network, a coaxial cable network, a HFC network, a wireless network, a DSL network, an ATM network, a combination thereof, etc.) connecting the storage device to user device may affect speed of access to information. In these aspects, the computing device may detect the type of network associated with each storage device and factor in the network type to identify preferred storage devices.

In step 1625, the computing device may consider one or more factors (e.g., proximity, cost, availability, and/or speed) to identify one or more preferred storage devices. In some aspects of the disclosure, all factors may be considered. In other aspects of the disclosure, fewer than all factors may be considered. Of factors considered, the computing device may apply even weights (e.g., 50% weight to cost and 50% weight to speed) or uneven weights (e.g., 10% weight to proximity, 60% weight to availability, and 30% weight to speed) to the factors. Storage devices with the highest cumulative score, for example, may be identified as preferred storage devices. Similarly, the computing device may rank storage devices based on factors considered and identify one or more storage devices having the best cumulative rank as a preferred storage device. For example, five storage devices may be ranked by an accumulated score for four factors (e.g., proximity, cost, availability, and speed), the lowest number indicating the best rank. Subsequently, the top two storage devices (e.g., having the lowest cumulative numbers) may be identified as preferred storage devices.

Returning to FIG. 4, in step 425, the computing device may identify alternative storage devices. In some aspects of the disclosure, alternative storage devices may include storage devices considered (e.g., in step 420), but not identified as preferred storage devices (e.g., storage devices having lower cumulative scores or ranked lower on a ranked list).

Alternatively (or in addition), the computing device may consider additional storage devices not previously considered in step 420 in a manner similar to identifying preferred storage devices (e.g., based on one or more factors, one or more weights, cumulative score, ranking, etc.). Alternative storage devices need not be networked storage devices available to multiple users. For example, an alternative storage device may include a local storage device associated with a user changing locations, such as local storage in a device carried by the user. Information may be transferred to local storage in the device prior to the user changing locations or after the user changes locations and connects to a network that may be used to transfer the information.

In some aspects of the disclosure, alternative storage devices may include stationary local storage (e.g., storage already located at the user's new location). For example, the alternative storage device may include a device (e.g., STB 107, digital video recorder, etc. owned, operated, used, etc. by the moving user or another trusted user, such as a co-worker, family member, etc.) located at the new location. A user may pre-identify one or more local storage devices as alternative storage devices. For example, a user may provide, to the computing device, information identifying a local drive (e.g., drive name, location, or other unique identifier) as an alternative storage device. Furthermore, a user may place restraints on use of the local drive (e.g., use local drive to temporarily store information if a more preferable storage device, e.g., a preferred storage device or a networked alternative storage device, cannot be initially identified).

In step 430, the computing device may identify one or more routing paths to transfer data to a new storage device. In some aspects of the disclosure, the computing device may consider the same or similar factors as in steps 420 and 425 (e.g., factoring in proximity, cost, availability, and/or speed to identify preferred and/or alternative storage devices) to identify preferred and/or alternative routing paths. For example, the computing device may determine the cost (e.g., in dollars/byte/hour) to transfer user information from one storage device (e.g., a common storage device, old storage device, etc.) to another (e.g., a new storage device). The cost computation may be performed for a plurality of routing paths. Based on the cost to transfer information, the computing device may identify preferred routing paths (e.g., routing paths having the lowest cost), secondary routing paths (e.g., routing paths having a medium cost), or even routing paths to avoid (e.g., routing paths having high costs, such as costs exceeding a predetermined threshold established by a moving user or a service provider operating the computing device). The computing device may consider additional factors, such as speed, to identify potential routing paths. For example, the computing device may determine the speed (e.g., based on a total amount of time or a time delay to transfer information to one or more new storage devices) for each potential routing path. In some aspects of the disclosure, the computing device may identify overloaded nodes (e.g., information transferred through the overloaded node may cause the node to meet or exceed bandwidth limitations) to determine the speed of each routing path. The computing device may also determine routing speed and/or costs as defined by one or more routing protocols (e.g., Open Shortest Path First, Border Gateway Protocol, etc.).

The computing device may consider any number of factors in identifying routing paths, including, but not limited to those previously described (e.g., proximity, cost, availability, and/or speed). Where more than one factor is considered, the computing device may weigh each considered factor evenly or unevenly. Similarly, the computing device may rank the routing paths by individual or cumulative scores (e.g., numbers associated with each or all factors considered), and select a predetermined number of routing paths having the best scores (e.g., highest rank) as preferred routing paths, a predetermined number of routing paths having the next best scores as alternative routing paths, etc.

In some aspects of the disclosure, weighing factors may additionally include factoring in the mode of commute (e.g., airplane, car, etc.) that a user is expected (e.g., as identified in a location schedule) to use when changing locations. For example, the computing device may weigh transfer speed more heavily than cost if the user is expected to use a fast transportation means (e.g., traveling from Philadelphia to Los Angeles via airplane) because the information may need to be transferred more quickly since the user will not be on the plane very long. On the other hand, the computing device may weigh cost more heavily than speed if the user is expected to use a slower transportation means (e.g., traveling from Philadelphia to Los Angeles via car) because the information might not need to be transferred as quickly since the user will be in the car for a long time anyway. Additionally, the mode of commute may indicate whether the user plans to access information at the associated location (e.g., Commute 1). For example, the user might not access information if the mode of commute is airplane, but may access information if the mode of commute is train. If the user is unlikely to access information during the commute (or any other downtime), the computing device may select a transfer speed that correlates with the time duration of the commute. For example, if the commute is 2 hours long (i.e., 7200 seconds long), and the user has 7,200 Mb of information to transfer, the computing device may cause the information to trickle to the new location over the 2 hour duration by, for example, selecting a transfer speed of 1 Mbps or a speed close thereto. The computing device may also factor in a time buffer when causing information to be trickled during downtime. For example, if the time buffer is 1 hour, the computing device may cause the 7,200 Mb of information to transfer at 2 Mbps, causing the information to transfer to the new location in 1 hour instead of 2.

In addition to considering factors described with respect to steps 420 and 425 (e.g., proximity, cost, availability, and/or speed), the computing device may consider one or more additional factors to identify routing paths to use. In some aspects of the disclosure, the computing device may consider whether one or more nodes should be avoided. For example, the computing device may identify a first routing path and one or more nodes associated with (e.g., included in) the first routing path. The computing device may also determine whether any nodes should be avoided. In some aspects of the disclosure, a node located in a particular geographical region may be avoided (e.g., a node located in a foreign country or region having weak network security protocols and/or laws). In additional aspects of the disclosure, a node owned by a different (e.g., competitor) service provider from a service provider that operates, manages, owns, uses, etc. the computing device may be avoided. For example, if a user changing locations is associated with a first service provider (e.g., the user is an employee or customer of the first service provider), nodes associated with a second service provider may preferably be avoided when transferring the user's information to a new storage device. The second service provider may include any competitor of the first service provider. Alternatively, the second service provider may include direct competitors of the first service provider, but exclude indirect competitors of the second service provider. The computing device may also determine to avoid network nodes that are unreliable or congested. In some aspects of the disclosure, nodes to avoid may be predetermined. For example, a user or an administrator associated with the computing device may pre-identify nodes or groups of nodes (e.g., nodes owned by a particular service provider) to avoid. Where one or more nodes should be avoided, the computing device may identify those nodes. In some aspects of the disclosure, the computing device may consider whether a routing path includes a node to avoid in identifying one or more routing paths to use. In other aspects of the disclosure, the computing device may determine that a routing path that includes a node to avoid should not be used.

In step 435, the computing device may select one or more storage devices and/or routing paths previously identified (e.g., in one of steps 420, 425, and 430). In some aspects of the disclosure, the computing device may automatically select, based on a cumulative weight of factors, one storage device to store user information. Similarly, the computing device may automatically select, based on a cumulative weight of factors, one routing path to use to transfer user information. In other aspects of the disclosure, the computing device may select additional storage devices and/or routing paths to use. For example, if a preferred storage device has enough storage space to store only a subset of user information, the computing device may select an additional storage device to store the remainder of the information. The computing device may also select multiple routing paths when, for example, the information may be transmitted quicker or more cost effectively by using multiple routing paths, such as when information is transmitted in parallel routing paths. Additionally, where one or more nodes may be avoided, the computing device may automatically select one or more routing paths that do not include the node.

Instead of automatically selecting one or more storage devices and/or routing paths, the computing device may provide storage and routing options to a user, and the user may select one or more storage devices and/or routing paths to use. In some aspects of the disclosure, the computing device may provide the user with a graphical user interface to view and/or select a storage device and/or routing path.

Figure 17:
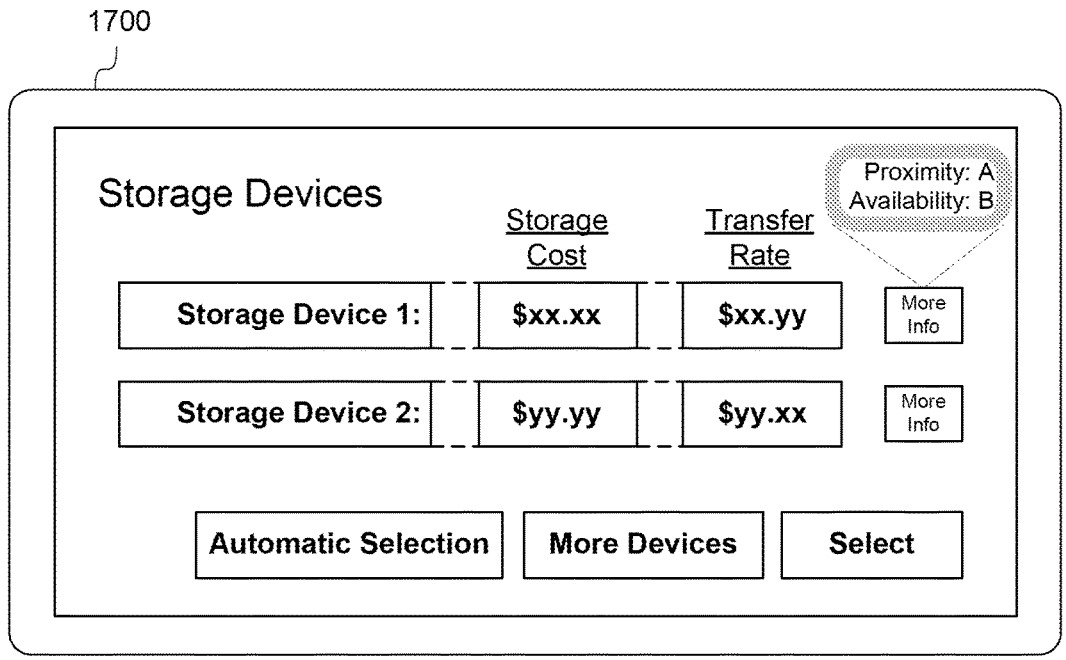
FIG. 17 illustrates an example interface for viewing and/or selecting a storage device according to one or more aspects described herein.

FIG. 17 illustrates an example interface 1700 for viewing and/or selecting a storage device according to one or more aspects described herein. The computing device may provide example interface 1700 to the user, such as through a user device (e.g., a laptop display, a mobile device display, etc.). Information provided in interface 1700 may include descriptions of one or more storage devices, such as a preferred and/or alternative storage device (e.g., the top two preferred storage devices or a combination of a preferred and an alternative storage device). Interface 1700, as illustrated in FIG. 17, may include two storage devices: "Storage Device 1" and "Storage Device 2." Interface 1700 may display values for one or more factors considered by the computing device in identifying preferred and/or alternative storage devices (e.g., in steps 420 and 425). For example, Storage Device 1 may be associated with a Storage cost Sxx.xx per byte stored per day and Transfer rate cost Sxx.yy kB/s, and Storage Device 2 may be associated with a Storage cost Syy.yy per byte stored per day and Transfer rate cost Syy.xx kB/s. Interface 1700 might not display values for all factors considered by the computing device. For example, values for proximity and/or availability, although considered by the computing device, might not initially be displayed by interface 1700. Instead, interface 1700 may include a "More Info" or equivalent button that may allow the user to view values for factors considered but not displayed. For example, if the user presses or hovers a cursor over the "More Info" button associated with Storage Device 1, the interface 1700 may display (e.g., in a separate graphical user interface page or as a pop-up in the instant user interface page) a proximity value (e.g., "Proximity: A," where A may indicate the distance from a user's new location to storage device 1) and/or an availability value (e.g., "Availability: B," where B may indicate the amount of storage space available at storage device 1).

The user may select a storage device by highlighting a storage device area (e.g., "Storage Device 1") and pressing a "Select" or equivalent button. The user may also view additional storage devices (preferred or alternative) by pressing a "More Locations" or equivalent button. Instead of manually selecting a storage device, the user may indicate that the computing device may automatically select a storage device by pressing an "Automatic Selection" or equivalent button. A user selection (e.g., manual or automatic selection) may be received by the computing device, and the computing device may identify the one or more storage devices accordingly.

Figure 18:
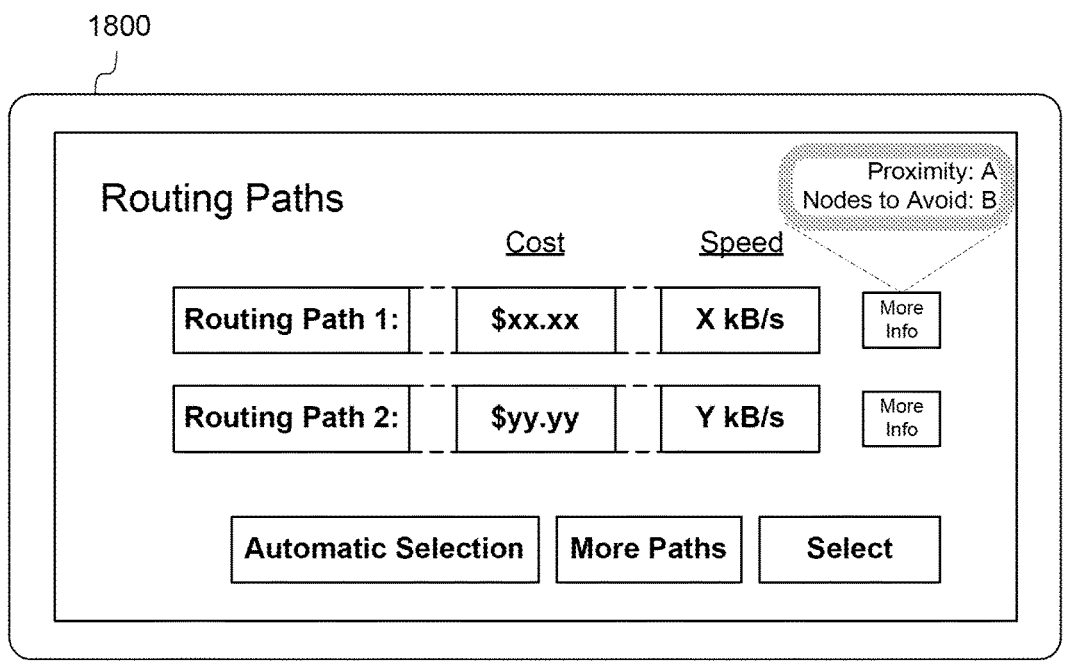
FIG. 18 illustrates an example interface for viewing and/or selecting an information routing path according to one or more aspects described herein.

FIG. 18 illustrates an example interface 1800 for viewing and/or selecting an information routing path according to one or more aspects described herein. The computing device may provide example interface 1800 to the user, such through a user device (e.g., a laptop display, a mobile device display, etc.). Information provided in interface 1800 may include descriptions of one or more routing paths such as a preferred and/or alternative routing path (e.g., the top two preferred routing paths or a combination of a preferred and an alternative routing path). Interface 1800, as illustrated in FIG. 18, may include two routing paths: "Routing Path 1" and "Routing Path 2." Interface 1800 may display values for one or more factors considered by the computing device in identifying preferred and/or alternative routing paths (e.g., in step 430). For example, Routing Path 1 may be associated with a Cost Sxx.xx per byte transferred at a Speed of X kB/s, and Routing Path 2 may be associated with a Cost Syy.yy per byte transferred at a Speed of Y kB/s. Interface 1800 might not display values for all factors considered by the computing device. For example, values for proximity and availability, although considered by the computing device, might not initially be displayed by interface 1800. Instead, interface 1800 may include "More Info" or equivalent button that may allow the user to view values for factors considered but not displayed. For example, if the user presses or hovers a cursor over the "More Info" button associated with Routing Path 1, the interface 1800 may display (e.g., in a separate graphical user interface page or as a pop-up in the instant user interface page) a proximity value (e.g., "Proximity: A," where A may indicate the distance user information travels from a user's old storage device to a user's new storage device) and/or a node avoidance value (e.g., "Nodes to Avoid: B," where B may indicate the number of nodes to avoid included in routing path 1). In some aspects of the disclosure, routing paths that include one or more nodes to avoid might not be displayed altogether.

The user may select a routing path by highlighting a routing path area (e.g., "Routing Path 1") and pressing a "Select" or equivalent button. The user may also view additional routing paths (preferred or alternative) by pressing a "More Paths" or equivalent button. Instead of manually selecting a routing path, the user may indicate that the computing device may automatically select a routing path by pressing an "Automatic Selection" or equivalent button. A user selection (e.g., manual or automatic selection) may be received by the computing device, and the computing device may identify the one or more routing paths accordingly.

Returning to FIG. 4, in step 440, the computing device may identify information to transfer to the new storage device. The computing device may use a unique identifier (e.g., MAC address, account number, account login name, user device identifier, etc.) associated with a request for information to locate a user's information at a common storage device or an old storage device. Furthermore, the user's information to be stored and/or transferred may be identified in a location schedule, such as one of schedules 800, 900, and 1000. In some aspects of the disclosure, the computing device may determine that all information (e.g., data, content, files, etc.) associated with the user should be transferred to the new storage device. In other aspects of the disclosure, the computing device may determine that a subset of user information should be transferred to the new storage device. Information associated with one or more user devices changing locations may be transferred to the new storage device. For example, as described with respect to step 410, information (e.g., audio content) capable of being accessed by devices (e.g., a mobile phone) changing locations may be transferred to the new storage device, whereas information (e.g., a spreadsheet file) incapable of being accessed by devices (e.g., the mobile phone) changing locations might not be transferred to the new storage device. Similarly, information pre-marked as being associated with one or more devices may be identified to be transferred if the one or more devices changes locations. Alternatively (or in addition), the computing device may transfer information to the new storage device based on a location type (e.g., work location, home location, etc.). For example, the computing device may provide work-related information (e.g., work documents, spreadsheets, etc.) to a work-type storage device and home-related information (e.g., movie content, music content, etc.) to a home-type storage device.

The computing device may consider additional factors to identify information to transfer, including, but not limited to, most used information, most recently used information, and association of a piece of information with another piece of information. A first piece of information may be considered associated with a second piece of information if the first and second pieces of information are often accessed together. For example, if the first piece of information (e.g., a word processor document) has previously been accessed within a predetermined time period (e.g., fifteen seconds) of accessing the second piece of information (e.g., a spreadsheet), the computing device may associate the first piece of information with the second piece of information and identify to transfer the first or second piece of information if the other is identified to be transferred. A second piece of information may also be considered associated with a first piece of information if the second piece of information is referenced by the first piece of information (e.g., if the first piece of information includes a link to the second piece of information). Several pieces of information may be associated with one another based on the information contained in each piece of information. For example, a file X (e.g., a word processor document) may include data "a" (e.g., an image), a file Y may include data "a" and data "b," and a file Z may include data "b." In this example, the computing device may associate file X with file Y because both include data "a." Similarly, the computing device may associate file Y with file Z because both include data "b." The computing device might also associate file X with file Z because they are linked by file Y (e.g., X and Y are linked by data "a," and Y and Z are linked by data "b"). While file X and Z have two degrees of separation, the computing device may associate files having any number of degrees of separation (e.g., six degrees of separation). The computing device may associate any number of files in the previously described manner. In other aspects of the disclosure a first and second piece of information may be associated with one another in a pre-determined manner, such as when a user previously associates one piece of information with another.

In step 445, the computing device may optionally determine the transfer order of information. Determining a transfer order may be beneficially used when storage or transmission limitations exist (e.g., insufficient storage space for information, limited transmission bandwidth capabilities, etc.). In some aspects of the disclosure, the computing device may determine the transfer order based on determinations made in step 440. For example, the computing device may determine that most used information, most recently used information, and/or information associated with one or more other information should be transferred first.

In step 450, the computing device may cause user information to be transferred to the new storage device. In some aspects of the disclosure, the transfer order may be consistent with the transfer order determined in step 445. The computing device may additionally transfer information at an optimal time, such as when the user typically does not access the information (e.g., during a commute identified in a user schedule). Alternatively (or in addition), the computing device may transfer information during off-peak times, such as when information traffic is low or when transferring information is cheaper relative to other times (e.g., peak information transfer times). Off-peak times may be during the close of regular business hours, such as the middle of the night (e.g., between 1:00 and 5:00 AM). Off-peak times may also depend on the time zone. In some aspects of the disclosure, where the information is transferred to an alternative storage device (e.g., a local storage device or an otherwise non-preferred storage device), the computing device may periodically (e.g., every hour, day, etc.) attempt to transfer information to a preferred storage device by determining whether the preferred storage device is available.

In some aspects of the disclosure, information from a common or home storage device may be provided to multiple storage devices. For example, information may be provided to a plurality of users at a plurality of geographical locations. Similarly, information may be provided to multiple storage devices to provide redundancy. For example, geographical redundancy may be utilized to minimize the impact of natural disasters (e.g., information stored at both a first and a second data center may be accessed even if the first data center is inactivated or destroyed by a hurricane). Information stored at a plurality of storage devices may be synchronized, such as to provide the most recent version of information at each storage device. Storing information at multiple locations may benefit multiple users where the users use the information, such as where the files are work-related and users are employed by the same company.

Although example embodiments are described above, the various features and steps may be combined, divided, omitted, and/or augmented in any desired manner, and other steps may be added, depending on the specific recommendation process desired. The scope of this patent should only be defined by the claims that follow.

We claim:

1. An apparatus comprising:
one or more processors; and
memory storing instructions that, when executed by the one or more processors, cause the apparatus to:
determine an anticipated location change of a user from a first geographical location to a second geographical location; and
after determining the anticipated location change, based on an indication that the user will access data associated with the user during the anticipated location change, and before the user changes location from the first geographical location to the second geographical location, move the data associated with the user from a storage device associated with the first geographical location to a mobile device associated with the user.

2. The apparatus of claim 1, wherein the instructions, when executed by the one or more processors, cause the apparatus to move the data associated with the user by moving the data further based on a location schedule associated with the user.

3. The apparatus of claim 1, wherein the instructions, when executed by the one or more processors, cause the apparatus to move the data associated with the user by moving the data after a determination that a duration of a travel period associated with the anticipated location change satisfies a threshold.

4. The apparatus of claim 1, wherein the instructions, when executed by the one or more processors, cause the apparatus to:
determine one or more capabilities of the mobile device; and
move, based on the one or more capabilities of the mobile device, second data associated with the user from the storage device to a second storage device associated with the second geographical location.

5. The apparatus of claim 1, wherein the instructions, when executed by the one or more processors, cause the apparatus to:
after moving the data associated with the user to the mobile device, move the data from the mobile device to a second storage device associated with the second geographical location.

6. The apparatus of claim 1, wherein the instructions, when executed by the one or more processors, cause the apparatus to:
after determining the anticipated location change and before the user changes location from the first geographical location to the second geographical location, move the data associated with the user from the storage device associated with the first geographical location to a second storage device associated with the second geographical location; and
synchronize the data moved to the mobile device with the data moved to the second storage device to update the data moved to the second storage device.

7. The apparatus of claim 1, wherein the instructions, when executed by the one or more processors, cause the apparatus to move the data associated with the user by moving the data after a determination that the data will be inaccessible during at least a portion of the anticipated location change.

8. The apparatus of claim 1, wherein the indication that the user will access the data is based on a duration of a travel period associated with the anticipated location change.

9. A system comprising:
a storage device associated with a first geographical location, the storage device comprising:
one or more processors; and
memory storing instructions that, when executed by the one or more processors of the storage device, cause the storage device to:
store data associated with a user; and
a computing device comprising:
one or more processors; and
memory storing instructions that, when executed by the one or more processors of the computing device, cause the computing device to:
determine an anticipated location change of the user from the first geographical location to a second geographical location; and
after determining the anticipated location change, based on an indication that the user will access the data associated with the user during the anticipated location change, and before the user changes location from the first geographical location to the second geographical location, move the data associated with the user from the storage device associated with the first geographical location to a mobile device associated with the user.

10. The system of claim 9, wherein the instructions stored in the memory of the computing device, when executed by the one or more processors of the computing device, cause the computing device to move the data associated with the user by moving the data based on a location schedule associated with the user.

11. The system of claim 9, wherein the instructions stored in the memory of the computing device, when executed by the one or more processors of the computing device, cause the computing device to move the data associated with the user by moving the data after a determination that a duration of a travel period associated with the anticipated location change satisfies a threshold.

12. The system of claim 9, wherein the instructions stored in the memory of the computing device, when executed by the one or more processors of the computing device, cause the computing device to:
determine one or more capabilities of the mobile device; and
move, based on the one or more capabilities of the mobile device, second data associated with the user from the storage device to a second storage device associated with the second geographical location.

13. The system of claim 9, wherein the instructions stored in the memory of the computing device, when executed by the one or more processors of the computing device, cause the computing device to:
after moving the data associated with the user to the mobile device, move the data from the mobile device to a second storage device associated with the second geographical location.

14. The system of claim 9, wherein the instructions stored in the memory of the computing device, when executed by the one or more processors of the computing device, cause the computing device to:
after determining the anticipated location change and before the user changes location from the first geographical location to the second geographical location, move the data associated with the user from the storage device associated with the first geographical location to a second storage device associated with the second geographical location; and synchronize the data moved to the mobile device with the data moved to the second storage device to update the data moved to the second storage device.

15. The system of claim 9, wherein the instructions stored in the memory of the computing device, when executed by the one or more processors of the computing device, cause the computing device to move the data associated with the user by moving the data after a determination that the data will be inaccessible during at least a portion of the anticipated location change.

16. The system of claim 9, wherein the indication that the user will access the data is based on a duration of a travel period associated with the anticipated location change.

17. An apparatus comprising:
one or more processors; and
memory storing instructions that, when executed by the one or more processors, cause the apparatus to:
determine an anticipated location change of a user from a first geographical location to a second geographical location; and
after determining the anticipated location change, based on an access indicator associated with the user and with a travel period associated with the anticipated location change, and before the user changes location from the first geographical location to the second geographical location, cause data associated with the user and stored at a storage device associated with the first geographical location to be stored at a mobile device associated with the user.

18. The apparatus of claim 17, wherein the instructions, when executed by the one or more processors, cause the apparatus to cause the data associated with the user to be stored at the mobile device by causing the data to be stored at the mobile device further based on a location schedule associated with the user.

19. The apparatus of claim 17, wherein the instructions, when executed by the one or more processors, cause the apparatus to cause the data associated with the user to be stored at the mobile device by causing the data to be stored at the mobile device after a determination that a duration of the travel period associated with the anticipated location change satisfies a threshold.

20. The apparatus of claim 17, wherein the instructions, when executed by the one or more processors, cause the apparatus to:
determine one or more capabilities of the mobile device; and
move, based on the one or more capabilities of the mobile device, second data associated with the user from the storage device to a second storage device associated with the second geographical location.

21. The apparatus of claim 17, wherein the instructions, when executed by the one or more processors, cause the apparatus to:
after causing the data associated with the user to be stored at the mobile device, move the data from the mobile device to a second storage device associated with the second geographical location.

22. The apparatus of claim 21, wherein the instructions, when executed by the one or more processors, cause the apparatus to move the data from the mobile device to the second storage device by moving the data to the second storage device after a determination that the second storage device is available.

23. The apparatus of claim 17, wherein the instructions, when executed by the one or more processors, cause the apparatus to:
after determining the anticipated location change and before the user changes location from the first geographical location to the second geographical location, move the data associated with the user from the storage device associated with the first geographical location to a second storage device associated with the second geographical location; and
synchronize the data stored at the mobile device with the data moved to the second storage device to update the data moved to the second storage device.

24. The apparatus of claim 17, wherein the access indicator is associated with a mode of transportation during the travel period associated with the anticipated location change.

25. A system comprising:
a storage device associated with a first geographical location, the storage device comprising:
one or more processors; and
memory storing instructions that, when executed by the one or more processors of the storage device, cause the storage device to:
store data associated with a user; and
a computing device comprising:
one or more processors; and
memory storing instructions that, when executed by the one or more processors of the computing device, cause the computing device to:
determine an anticipated location change of the user from the first geographical location to a second geographical location; and
after determining the anticipated location change, based on an access indicator associated with the user and with a travel period associated with the anticipated location change, and before the user changes location from the first geographical location to the second geographical location, cause the data associated with the user and stored at the storage device associated with the first geographical location to be stored at a mobile device associated with the user.

26. The system of claim 25, wherein the instructions stored in the memory of the computing device, when executed by the one or more processors of the computing device, cause the computing device to cause the data associated with the user to be stored at the mobile device by causing the data be stored at the mobile device further based on a location schedule associated with the user.

27. The system of claim 25, wherein the instructions stored in the memory of the computing device, when executed by the one or more processors of the computing device, cause the computing device to cause the data associated with the user to be stored at the mobile device by causing the data associated with the user to be stored at the mobile device after a determination that a duration of the travel period associated with the anticipated location change satisfies a threshold.

28. The system of claim 25, wherein the instructions stored in the memory of the computing device, when executed by the one or more processors of the computing device, cause the computing device to:
determine one or more capabilities of the mobile device; and
move, based on the one or more capabilities of the mobile device, second data associated with the user from the storage device to a second storage device associated with the second geographical location.

29. The system of claim 25, wherein the instructions stored in the memory of the computing device, when executed by the one or more processors of the computing device, cause the computing device to:
  after causing the data associated with the user to be stored at the mobile device, move the data from the mobile device to a second storage device associated with the second geographical location.

30. The system of claim 29, wherein the instructions stored in the memory of the computing device, when executed by the one or more processors of the computing device, cause the computing device to move the data by moving the data to the second storage device after a determination that the second storage device is available.

31. The system of claim 25, wherein the instructions stored in the memory of the computing device, when executed by the one or more processors of the computing device, cause the computing device to:
  after determining the anticipated location change and before the user changes location from the first geographical location to the second geographical location, move the data associated with the user from the storage device associated with the first geographical location to a second storage device associated with the second geographical location; and
  synchronize the data stored at the mobile device with the data moved to the second storage device to update the data moved to the second storage device.

32. The system of claim 25, wherein the access indicator is associated with a mode of transportation during the travel period associated with the anticipated location change.

33. An apparatus comprising:
  one or more processors; and
  memory storing instructions that, when executed by the one or more processors, cause the apparatus to:
    determine an anticipated location change of a user to a geographical location; and
    after determining the anticipated location change and based on a determination that a likelihood that the user will access data associated with the user during a commute associated with the anticipated location change satisfies a threshold, move the data associated with the user to a mobile device associated with the user.

34. The apparatus of claim 33, wherein the instructions, when executed by the one or more processors, cause the apparatus to move the data associated with the user by moving the data further based on a location schedule associated with the user.

35. The apparatus of claim 33, wherein the instructions, when executed by the one or more processors, cause the apparatus to move the data associated with the user by moving the data after a determination that a duration of the commute associated with the anticipated location change satisfies a threshold.

36. The apparatus of claim 33, wherein the likelihood that the user will access the data is based on information indicative of data access of the user during a past location change of the user.

37. A system comprising:
  a mobile device associated with a user; and
  a computing device comprising:
    one or more processors; and
    memory storing instructions that, when executed by the one or more processors of the computing device, cause the computing device to:
      determine an anticipated location change of the user to a geographical location; and
      after determining the anticipated location change and based on a determination that a likelihood that the user will access data associated with the user during a commute associated with the anticipated location change satisfies a threshold, move the data associated with the user to the mobile device;
  wherein the mobile device comprises:
    one or more processors; and
    memory storing instructions that, when executed by the one or more processors of the mobile device, cause the mobile device to:
      receive the data associated with a user.

38. The system of claim 37, wherein the instructions stored in the memory of the computing device, when executed by the one or more processors of the computing device, cause the computing device to move the data associated with the user by moving the data further based on a location schedule associated with the user.

39. The system of claim 37, wherein the instructions stored in the memory of the computing device, when executed by the one or more processors of the computing device, cause the computing device to move the data associated with the user by moving the data after a determination that a duration of the commute associated with the anticipated location change satisfies a threshold.

40. The system of claim 37, wherein the likelihood that the user will access the data is based on information indicative of data access of the user during a past location change of the user.

* * * * *

UNITED STATES PATENT AND TRADEMARK OFFICE
CERTIFICATE OF CORRECTION

PATENT NO. : 10,430,720 B2
APPLICATION NO. : 15/443437
DATED : October 1, 2019
INVENTOR(S) : Bevan et al.

It is certified that error appears in the above-identified patent and that said Letters Patent is hereby corrected as shown below:

On the Title Page

Item (72) Inventors, Column 1, Line 1:
Please Delete "Voohees," and insert --Voorhees,--

Item (63) Related U.S. Application Data, Column 1, Line 1:
Delete "(60)" and insert --(63)--

In the Specification

Detailed Description, Column 16, Line 31:
Delete "PLAYERTTM" and insert --PLAYERTM--

Detailed Description, Column 21, Line 62:
Delete "Sxx.xx" and insert --$xx.xx--

Detailed Description, Column 21, Line 62:
Delete "Sxx.yy" and insert --$xx.yy--

Detailed Description, Column 21, Line 64:
Delete "Syy.yy" and insert --$yy.yy--

Detailed Description, Column 21, Line 65:
Delete "Syy.xx" and insert --$yy.xx--

Detailed Description, Column 22, Line 41:
Delete "Sxx.xx" and insert --$xx.xx--

Detailed Description, Column 22, Line 42:
Delete "Syy.yy" and insert --$yy.yy--

Signed and Sealed this
Thirtieth Day of August, 2022

Katherine Kelly Vidal
*Director of the United States Patent and Trademark Office*